(12) United States Patent
Tan et al.

(10) Patent No.: US 9,393,483 B2
(45) Date of Patent: Jul. 19, 2016

(54) MOTORIZED VEHICLE

(71) Applicant: DYNAMIC LABS, LLC, Los Angeles, CA (US)

(72) Inventors: Andrew Paolo Belandres Tan, West Hills, CA (US); Christopher Mew Azuma Chock, Rolling Hills Estates, CA (US)

(73) Assignee: Dynamic Labs, LLC, Los Angeles, CA (US)

( * ) Notice: Subject to any disclaimer, the term of this patent is extended or adjusted under 35 U.S.C. 154(b) by 0 days.

(21) Appl. No.: 14/846,622

(22) Filed: Sep. 4, 2015

(65) Prior Publication Data

US 2016/0067588 A1 Mar. 10, 2016

Related U.S. Application Data

(60) Provisional application No. 62/046,832, filed on Sep. 5, 2014.

(51) Int. Cl.
*B62K 11/00* (2006.01)
*A63C 17/01* (2006.01)
(Continued)

(52) U.S. Cl.
CPC ............. *A63C 17/12* (2013.01); *A63C 17/011* (2013.01); *A63C 17/016* (2013.01); *B60L 15/00* (2013.01)

(58) Field of Classification Search
CPC ........ B62K 3/002; B62K 11/00; A63C 17/01; A63C 17/016; A63C 17/02; A63C 6/08; A63C 3/00; A63B 7/08; A63B 22/14; G10H 3/00; G05G 1/445
See application file for complete search history.

(56) References Cited

U.S. PATENT DOCUMENTS

| 5,864,333 A | 1/1999 | O'Heir |
|---|---|---|
| 6,050,357 A | 4/2000 | Staelin et al. |

(Continued)

FOREIGN PATENT DOCUMENTS

| CN | 202751772 U | 2/2013 |
|---|---|---|
| CN | 103170122 A | 6/2013 |

(Continued)

OTHER PUBLICATIONS

International Search Report and Written Opinion for International Application No. PCT/US2015/048700, mailed Dec. 2, 2015, 16 pages.

(Continued)

*Primary Examiner* — Bryan Evans
(74) *Attorney, Agent, or Firm* — Lewis Roca Rothgerber Christie LLP

(57) ABSTRACT

A motorized vehicle is disclosed including a deck to support a rider, at least two wheels coupled to the deck, a footpad rotatably coupled to the deck, and a drive motor coupled to one of the wheels and the footpad. The drive motor is configured to rotate one of the wheels when the footpad is in an engaged position. An actively stabilized motorized vehicle is also disclosed including a deck, a pair of in-line wheels coupled to the deck, a steering motor to adjust a steering angle of one of the wheels, a series of sensors to measure dynamic conditions of the motorized vehicle, a microprocessor to calculate, based on the dynamic conditions, a stabilizing steering angle acceleration of one of the wheels, and a controller to send a signal to the steering motor to steer the second wheel with the stabilizing steering angle acceleration to stabilize the vehicle.

21 Claims, 18 Drawing Sheets

(51) Int. Cl.
*A63C 17/12* (2006.01)
*B60L 15/00* (2006.01)

(56) References Cited

U.S. PATENT DOCUMENTS

| | | | |
|---|---|---|---|
| 7,053,288 B2 | 5/2006 | Iwai et al. | |
| 7,053,289 B2 | 5/2006 | Iwai et al. | |
| 7,350,787 B2 | 4/2008 | Voss | |
| 7,458,435 B2 | 12/2008 | Negoro et al. | |
| 7,467,681 B2 | 12/2008 | Hiramatsu | |
| 8,240,230 B2 * | 8/2012 | Peniston | B60K 26/021 324/207.12 |
| 8,322,477 B2 | 12/2012 | Kamen et al. | |
| 2005/0211078 A1 * | 9/2005 | Iwai | A63C 5/06 84/723 |
| 2008/0173124 A1 * | 7/2008 | Thiel | G05G 1/445 74/512 |
| 2008/0242515 A1 | 10/2008 | Odien | |
| 2013/0206493 A1 * | 8/2013 | Larson | A63C 17/012 180/181 |
| 2013/0248573 A1 | 9/2013 | Kim et al. | |

FOREIGN PATENT DOCUMENTS

| | | |
|---|---|---|
| CN | 203032845 U | 7/2013 |
| CN | 203180813 U | 9/2013 |
| CN | 203244742 U | 10/2013 |
| CN | 203244743 U | 10/2013 |
| CN | 203318594 U | 12/2013 |
| JP | 3107539 U | 2/2005 |
| JP | 2006217952 A | 8/2006 |
| WO | WO 2013/052707 A1 | 4/2013 |

OTHER PUBLICATIONS http://www.bornrich.com/special-edition-weight-sensing-electric-skateboards-fun-ride.html, "Special Edition Weight-Sensing Electric Skateboards are for a fun ride to anywhere," 4 pages, Jan. 11, 2016.
http://www.instructables.com/id/Self-balancing-skateboardsegwy-project-Arduino-S/, "Self-balancing skateboard/segw*y project Arduino Shield," 14 pages, Jan. 11, 2016.

* cited by examiner

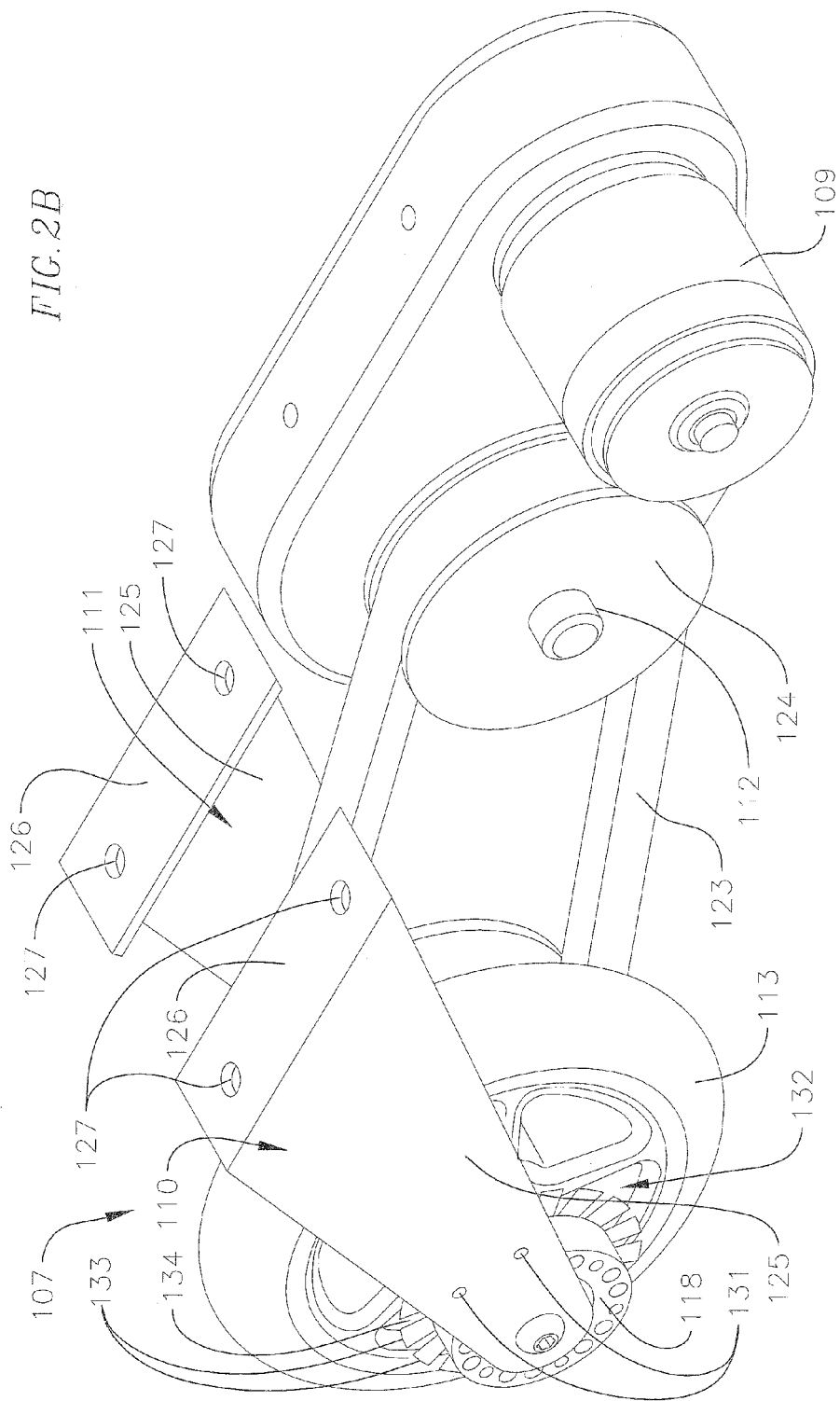

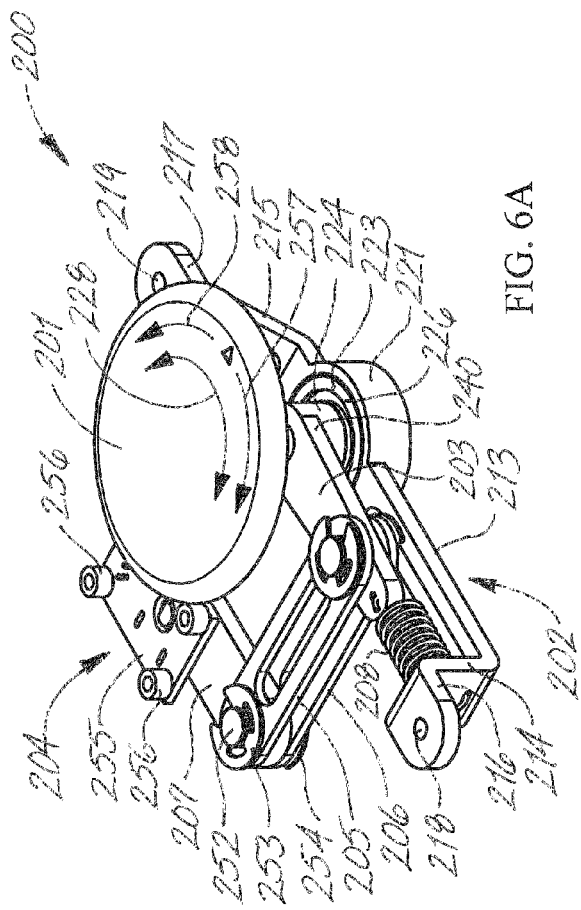
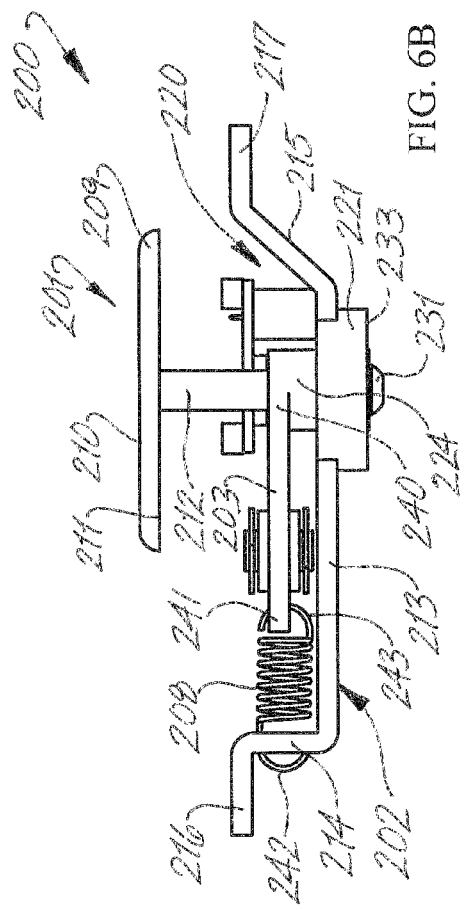
FIG. 6A
FIG. 6B

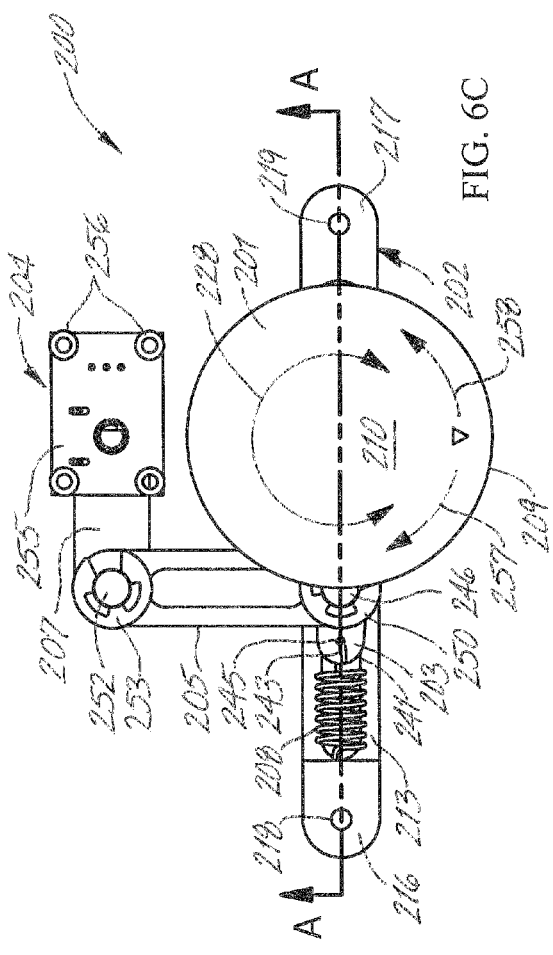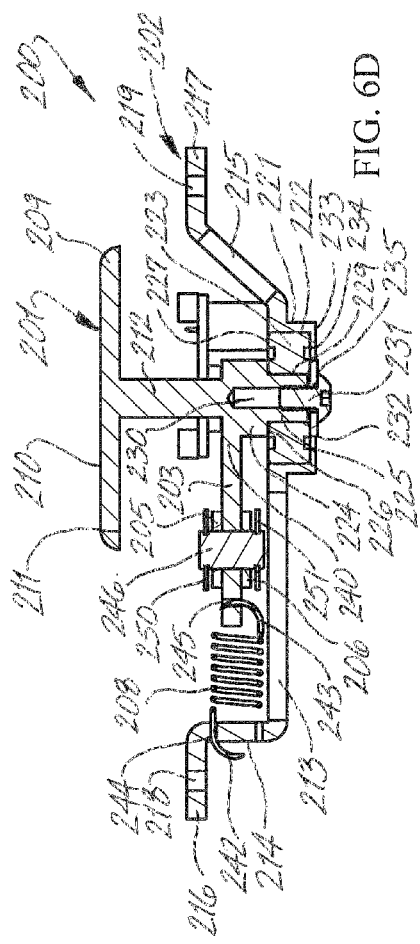

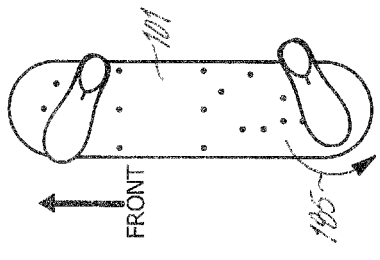
FIG. 7A
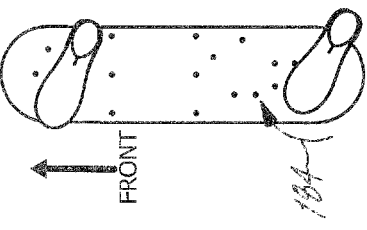
FIG. 7B
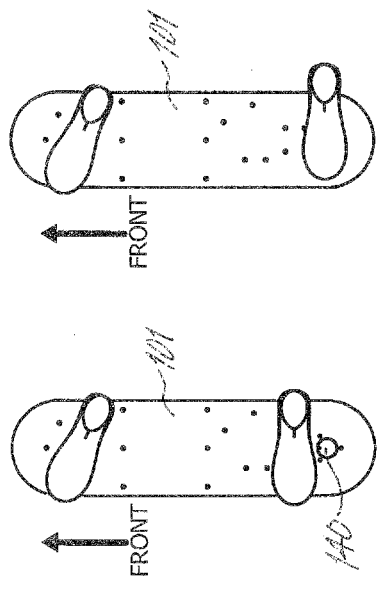
FIG. 7C
FIG. 7D
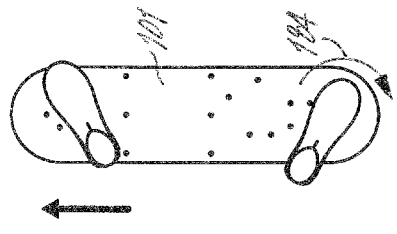
FIG. 7E
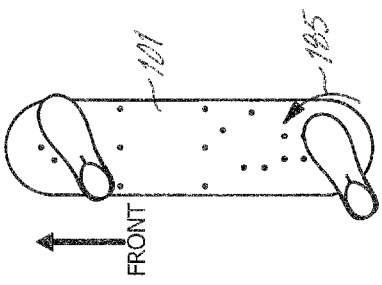
FIG. 7F
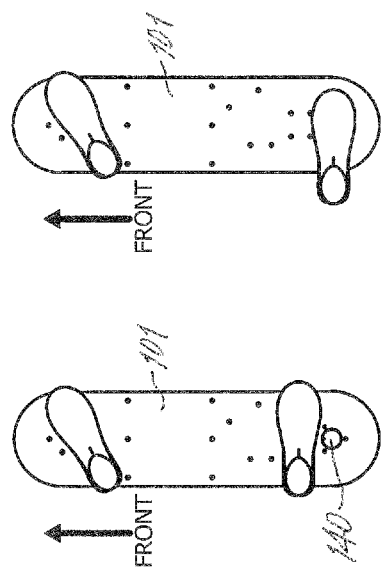
FIG. 7G
FIG. 7H

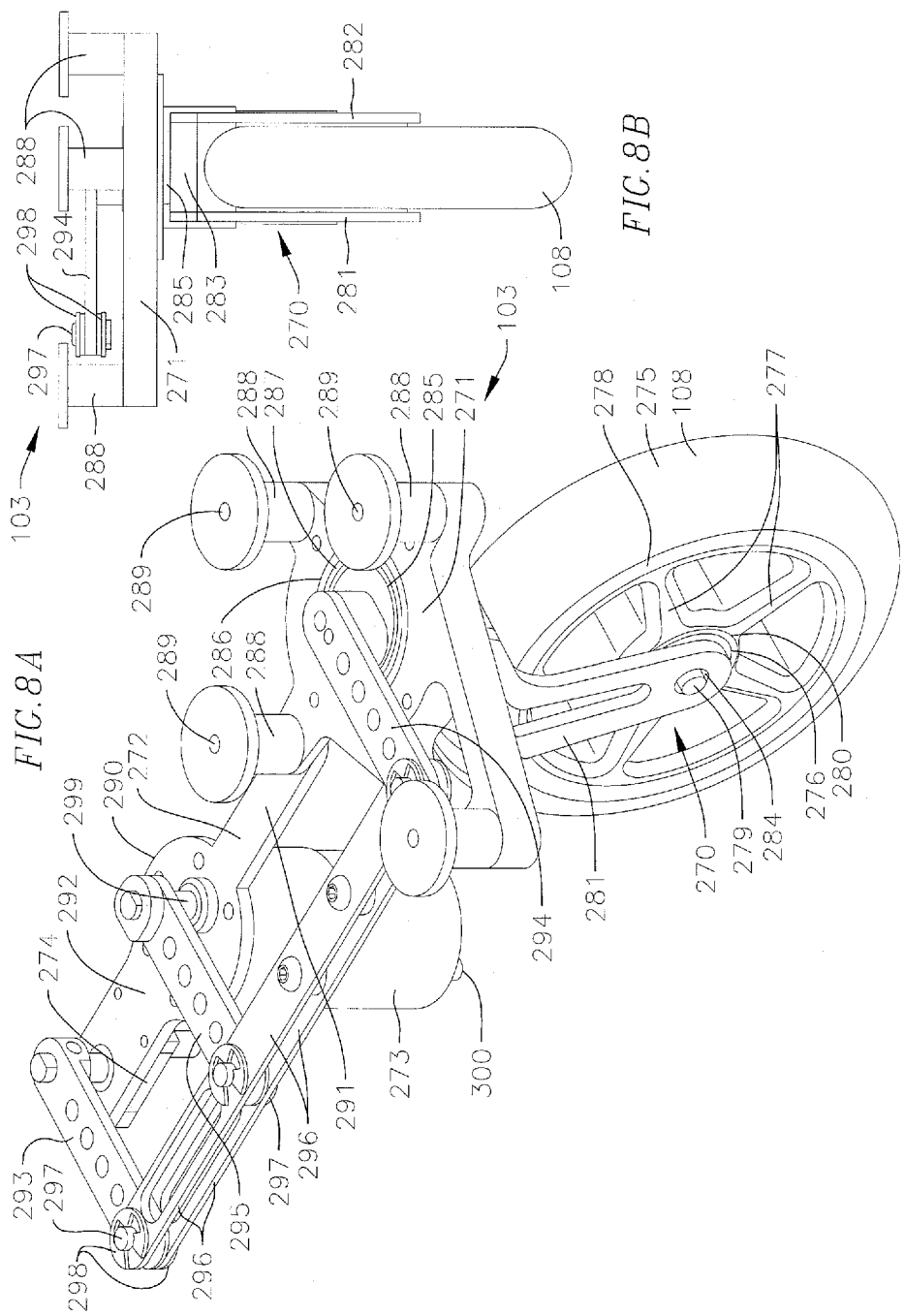

MOTORIZED VEHICLE

CROSS-REFERENCE TO RELATED APPLICATION

This application claims priority to and the benefit of U.S. Provisional Application No. 62/046,832, filed Sep. 5, 2014, the entire contents of which are incorporated herein by reference.

FIELD

The present invention relates generally to wheeled vehicles and, more particularly, to motorized wheeled vehicles.

BACKGROUND

A variety of personal recreational and personal transportation vehicles exist, including skateboards, scooters, and bicycles. Motorized personal recreational vehicles may be either inherently stable or inherently unstable. For instance, some conventional vehicles may include a wheel configuration that is naturally stable. Other conventional vehicles may include relatively large and/or heavy wheels such that the vehicle is balanced due to gyroscopic precession of the wheels. However, conventional vehicles that include an inherently unstable arrangement of small and/or light-weight wheels may require the user to periodically place his or her foot on the ground in order to maintain balance.

Additionally, conventional recreational and transportation vehicles may be either self-propelled (e.g., motor-driven) or human-powered. Some conventional motor-driven vehicles include a throttle integrated into a handlebar assembly. However, handlebar assemblies may increase the expense and complexity of the vehicle. Additionally, handlebar assemblies may increase the size of the vehicle which may limit the portability and maneuverability of the vehicle. Other conventional motor-driven vehicles may include sensors embedded into a platform on which the user stands. For instance, some conventional motorized vehicles may include front and rear weight sensors that require the user to shift his or her center of gravity forward and backward on the platform of the vehicle to accelerate and decelerate, respectively. However, such forward and backwards movements of the user on the platform may make the user more prone to losing his or her balance and falling off of the vehicle.

SUMMARY

The present disclosure is directed to various embodiments of a motorized vehicle. In one embodiment, the motorized vehicle includes a deck configured to support a rider, a series of wheels coupled to the deck, a footpad rotatably coupled to the deck, and a drive motor operatively coupled to at least one of the wheels and electrically coupled to the footpad. The footpad is configured to rotate between a neutral position and an engaged position. The drive motor is configured to rotate at least one of the wheels when the footpad is in the engaged position. The motorized vehicle may include an angular position sensor configured to detect the angular position of the footpad, a microprocessor electrically coupled to the angular position sensor, and a controller electrically coupled to the drive motor. The microprocessor is configured to process an output signal from the angular position sensor. The controller is configured to send a signal to the drive motor to rotate at least one of the wheels based on the angular position of the footpad. The drive motor may be configured to rotate at least one of the wheels at a first speed when the footpad is in a first angular position and the drive motor may be configured to rotate at least one of the wheels at a second speed greater than the first speed when the footpad is in a second angular position greater than the first angular position. The drive motor may be configured to decelerate at least one of the wheels when the footpad is in a third angular position. The angular position sensor may be any suitable type of sensor, such as a magnetic angular position sensor, an optical angular position sensor, a rotary potentiometer, or a resistive rotary position sensor. The motorized vehicle may include a resilient member coupled to the footpad to bias the footpad into the neutral position. The motorized vehicle may include a first spring coupled to the footpad and a second spring coupled to the footpad. The footpad engages the first spring when the footpad rotates in a first direction to bias the footpad into the neutral position. The footpad engages the second spring when the footpad rotates in a second direction opposite the first direction to bias the footpad into the neutral position. The motorized vehicle may include any suitable number of wheels and the wheels may have any suitable configuration, such as two in-line wheels or four wheels arranged in a rectangular configuration. The motorized vehicle may include a switch coupled to the angular position sensor. When the switch is in a first position, the drive motor is configured to rotate one of the wheels when the footpad rotates in a first direction. When the switch is in a second position, the drive motor is configured to rotate of the wheels when the footpad rotates in a second direction opposite the first direction. The drive motor may be configured not to rotate the wheels when the angular position of the footpad is within an angular deadzone about the neutral position. The motorized vehicle may include an opening defined in the deck. An upper surface of the footpad is exposed through the opening in the deck. The motorized vehicle may also include a battery electrically coupled to the drive motor.

The present disclosure is also directed to various embodiments of an actively stabilized motorized vehicle. In one embodiment, the actively stabilized motorized vehicle includes a deck configured to support a rider, a first wheel coupled to the deck, a second wheel steerably coupled to the deck and in-line with the first wheel, a steering motor operatively coupled to the second wheel that is configured to adjust a steering angle of the second wheel between a first steering angle and a second steering angle, a series of sensors configured to measure a series of dynamic conditions of the motorized vehicle, a microprocessor programmed with an algorithm configured to calculate a stabilizing steering angle acceleration of the second wheel based on the series of dynamic conditions of the motorized vehicle necessary to stabilize the motorized vehicle, and a controller configured to send a signal to the steering motor to steer the second wheel with the stabilizing steering angle acceleration to stabilize the motorized vehicle. The sensors may include a 3-axis gyroscope, a 3-axis accelerometer, and a steering angle sensor. The sensors may also include a wheel speed sensor or the microprocessor may be configured to measure commutation of a drive motor coupled to the first wheel. The algorithm may be a state dependent Riccati equation. The dynamic conditions measured by the sensors may include a roll angle of the deck, an angular velocity of the deck, a linear velocity of the deck, a linear acceleration of the deck, the steering angle of the second wheel, a steering angle velocity of the second wheel, a pitch angle of the ground, and/or a roll angle of the ground. The actively stabilized motorized vehicle may include a footpad rotatably coupled to the deck and a drive motor operatively coupled to at least one of the first wheel and the second wheel and electrically coupled to the footpad. The footpad is configured to rotate between a neutral position and an engaged position, and the drive motor is configured to rotate the at least one of the first wheel and the second wheel based on an angular position of the footpad. The actively stabilized motorized vehicle may include a control loop feedback mechanism configured to account for losses in controlling the second wheel with the stabilizing steering angular acceleration. The control loop feedback mechanism may be configured to determine an error between the stabilizing steering angular acceleration of the second wheel and an actual steering angular acceleration of the second wheel or the control loop feedback mechanism may be configured to measure a roll angular acceleration of the deck.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

Embodiments of a motorized vehicle according to the present disclosure are described with reference to the following figures. The same reference numerals are used throughout the figures to reference like features and components. The figures are not necessarily drawn to scale.

FIGS. 2A, 2B, and 2C are an exploded perspective view, a perspective view, and an side view, respectively, of a rear drive assembly according to one embodiment of the present disclosure;

FIGS. 6A-6D are a perspective view, a side view, a top view, and a cross-sectional view taken along line A-A, respectively, of a footpad assembly according to another embodiment of the present disclosure;

FIGS. 7A-7H illustrate a user actuating a footpad assembly to accelerate and decelerate the motorized vehicle based on the stance of the user on the vehicle;

FIGS. 8A-8D are a perspective view, a front view, a top view, and a side view, respectively, of a front steering assembly according to one embodiment of the present disclosure;

DETAILED DESCRIPTION

The present disclosure is directed to a motorized vehicle. Embodiments of the present disclosure are directed to a motorized vehicle including a steering assembly configured to actively stabilize the motorized vehicle in a balanced state by turning a front wheel of the vehicle when, for instance, a user standing on the motorized vehicle steers the vehicle by shifting his or her center of gravity to impart a roll to the vehicle. Embodiments of the present disclosure are also directed to a motorized vehicle having a footpad assembly configured to enable a user standing on the motorized vehicle to accelerate and decelerate the motorized vehicle by rotating the footpad assembly with the user's foot.

Figure 1A:
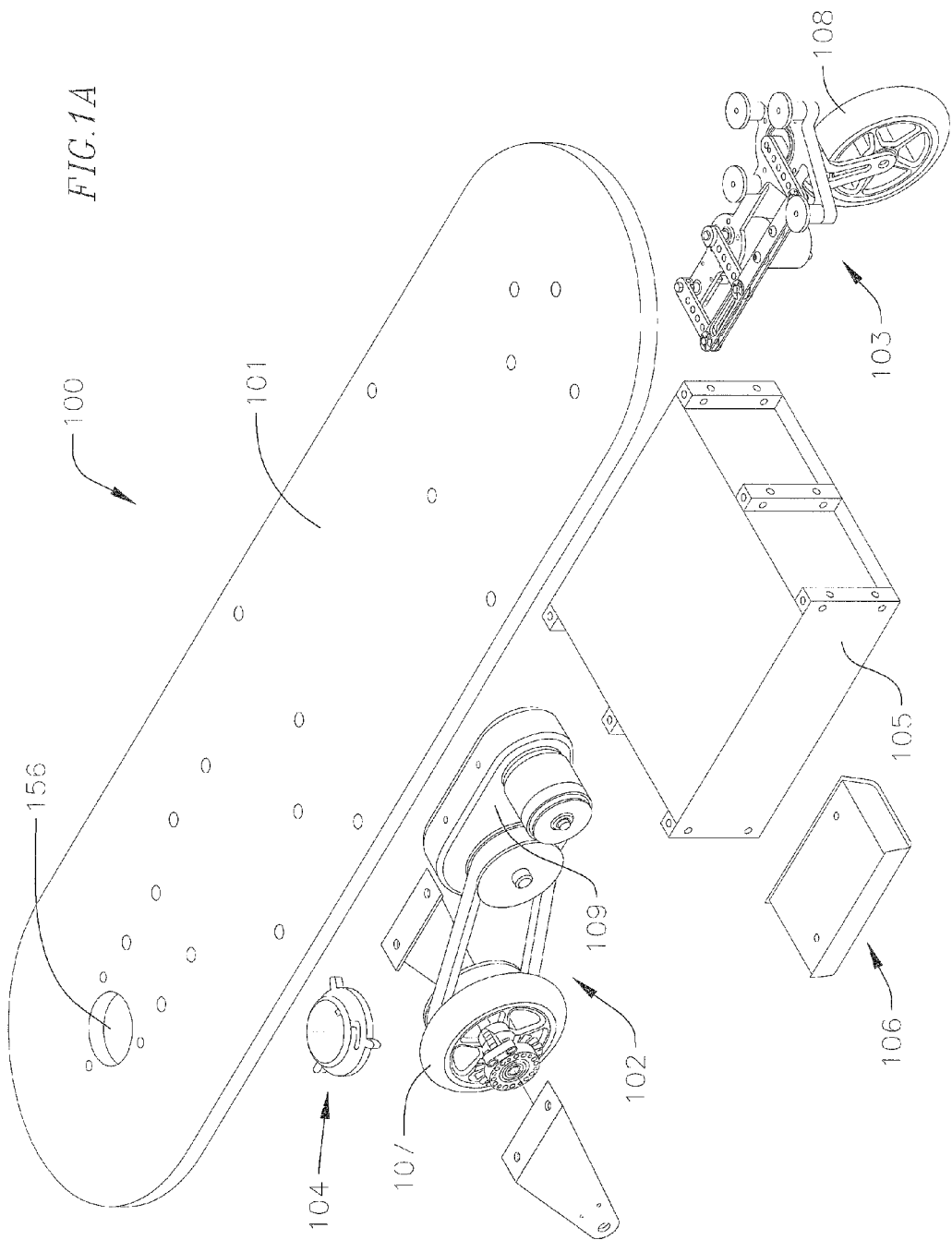
FIGS. 1A and 1B are an exploded perspective view and a perspective view, respectively, of a motorized vehicle according to one embodiment of the present disclosure.
Figure 1B:
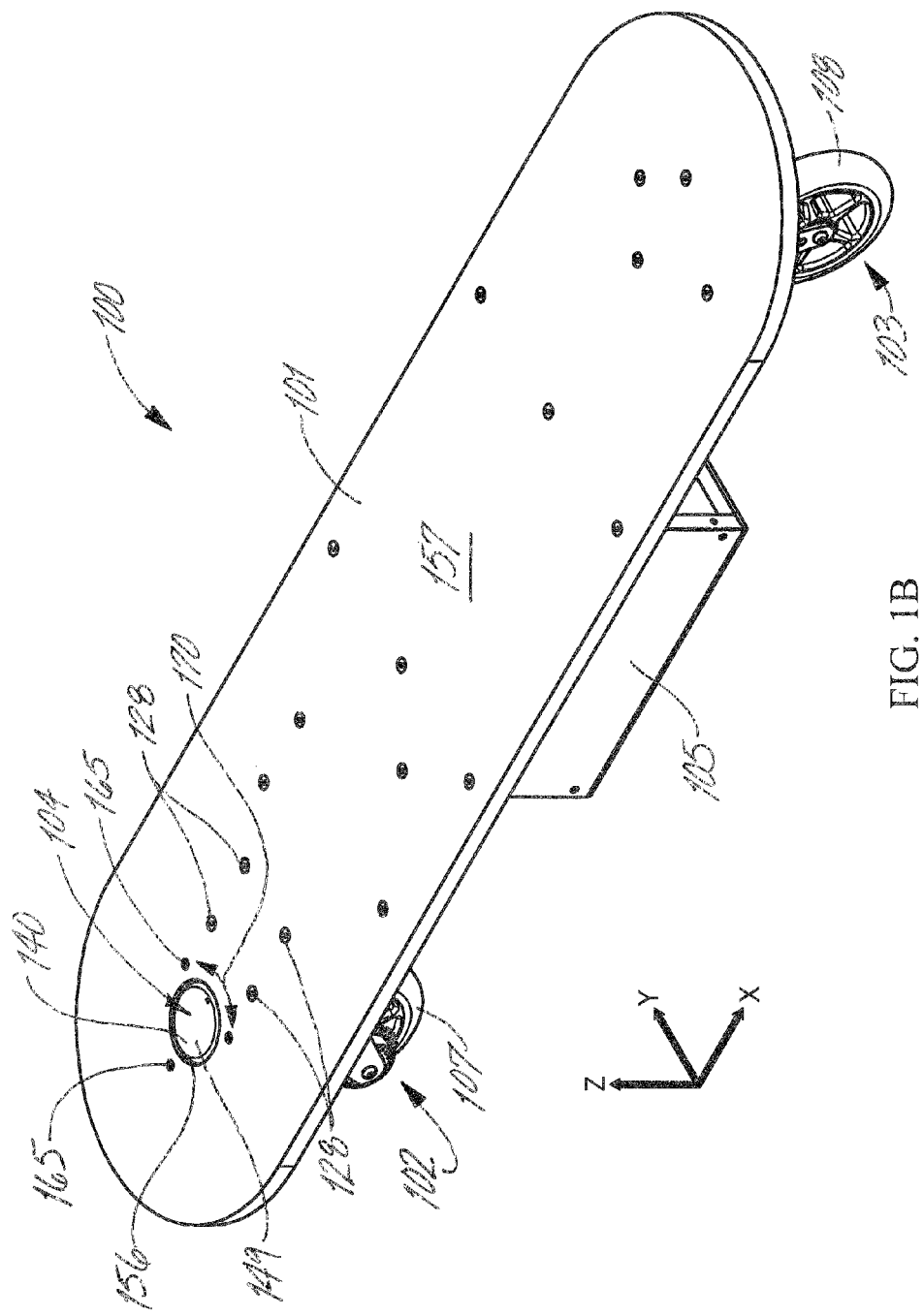

With reference now to FIGS. 1A and 1B, a motorized vehicle 100 according to one embodiment of the present disclosure includes a board or a deck 101 configured to support a user, a rear drive assembly 102 configured to accelerate and decelerate the motorized vehicle 100, a front steering assembly 103 in-line with the rear drive assembly 102, a footpad assembly 104 rotatably coupled to the deck 101 and operatively coupled to the rear drive assembly 102, a battery 105 for powering the rear drive assembly 102 and the front steering assembly 103, and an electronics housing 106 accommodating a variety of electronics components (e.g., sensors, microcontrollers, and/or microprocessors). The rear drive assembly 102 includes a rear wheel 107 and the front drive assembly 103 includes a front wheel 108 in-line with the rear wheel 107. As described in detail below, the electronics components in the electronics housing 106 are configured to measure, detect, or calculate a variety of dynamic conditions of the motorized vehicle 100 (e.g., the roll angle of the deck 101, the roll angular velocity of the deck 101, the steering angular velocity of the front wheel 108, and the steering angular acceleration of the front wheel 108). As described below, the motorized vehicle 100 may also include additional sensors to measure the linear velocity of the motorized vehicle 100 and the steering angle of the front wheel 108. Based on the measured dynamic conditions of the motorized vehicle 100, a microcontroller in the electronics housing 106 is configured to send a signal to the front steering assembly 103 to adjust the steering angular acceleration of the front wheel 108 in order to stabilize the motorized vehicle 100 in a balanced state. The footpad assembly 104 enables a user standing on the deck 101 to accelerate and decelerate the motorized vehicle 100 by adducting and abducting the user's rear foot, respectively, to rotate the footpad assembly 104. Based on the angular position of the footpad assembly 104, a drive motor 109 coupled to the rear wheel 107 is configured to vary the power supplied to the rear wheel 107 and thereby control the linear velocity of the motorized vehicle 100. In one or more embodiments, the drive motor 109 is configured to increase the power supplied to the rear wheel 107, and thereby increase the rotation rate of the rear wheel 107, as the angle of the footpad assembly 104 increases. The deck 101 of the motorized vehicle 100 may be made out of any suitably strong and durable material sufficient to support the weight of a user, such as, for instance, wood, metal, plastic, carbon fiber, or any combinations thereof.

Figure 2A:
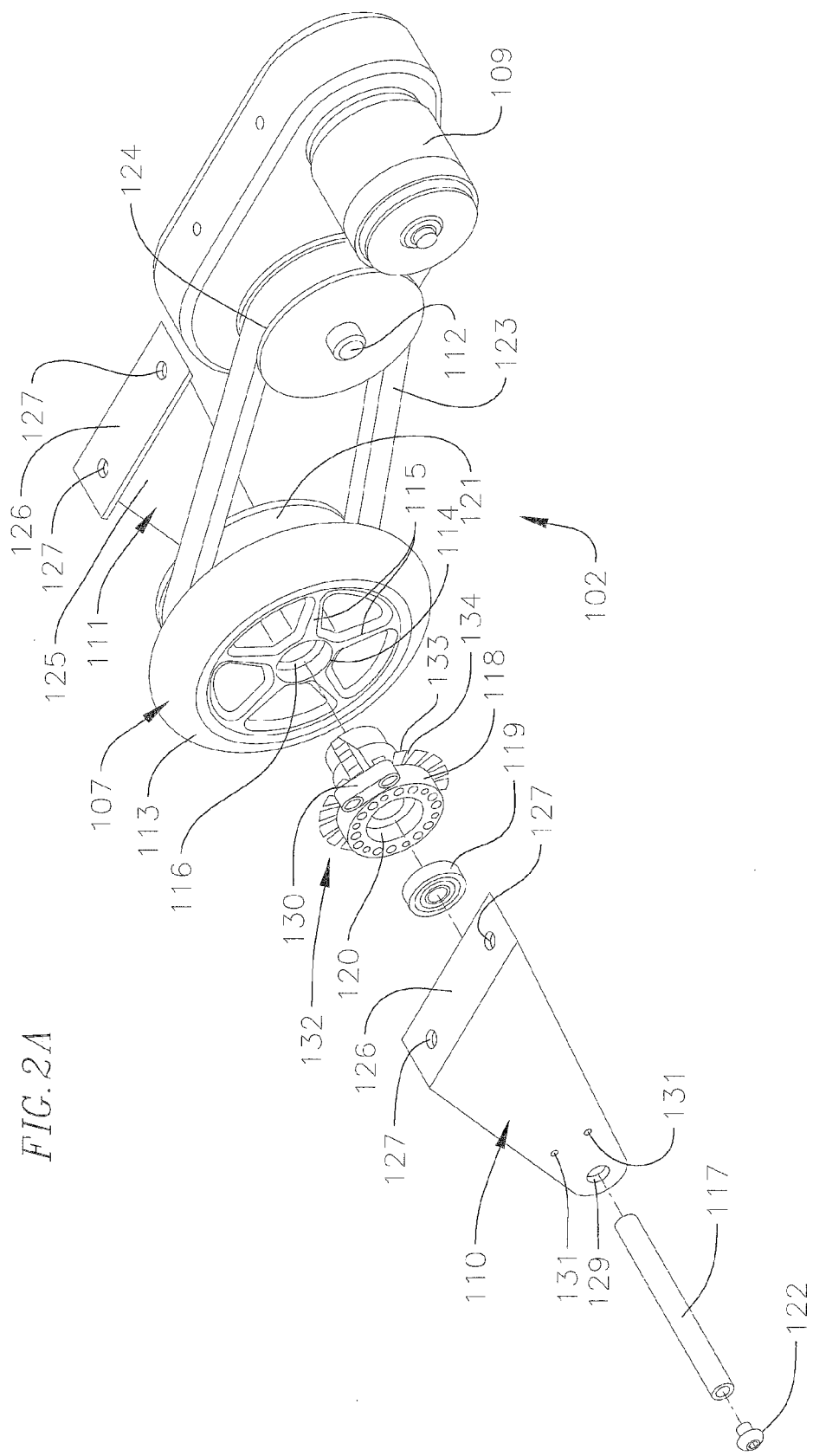
Figure 2C:
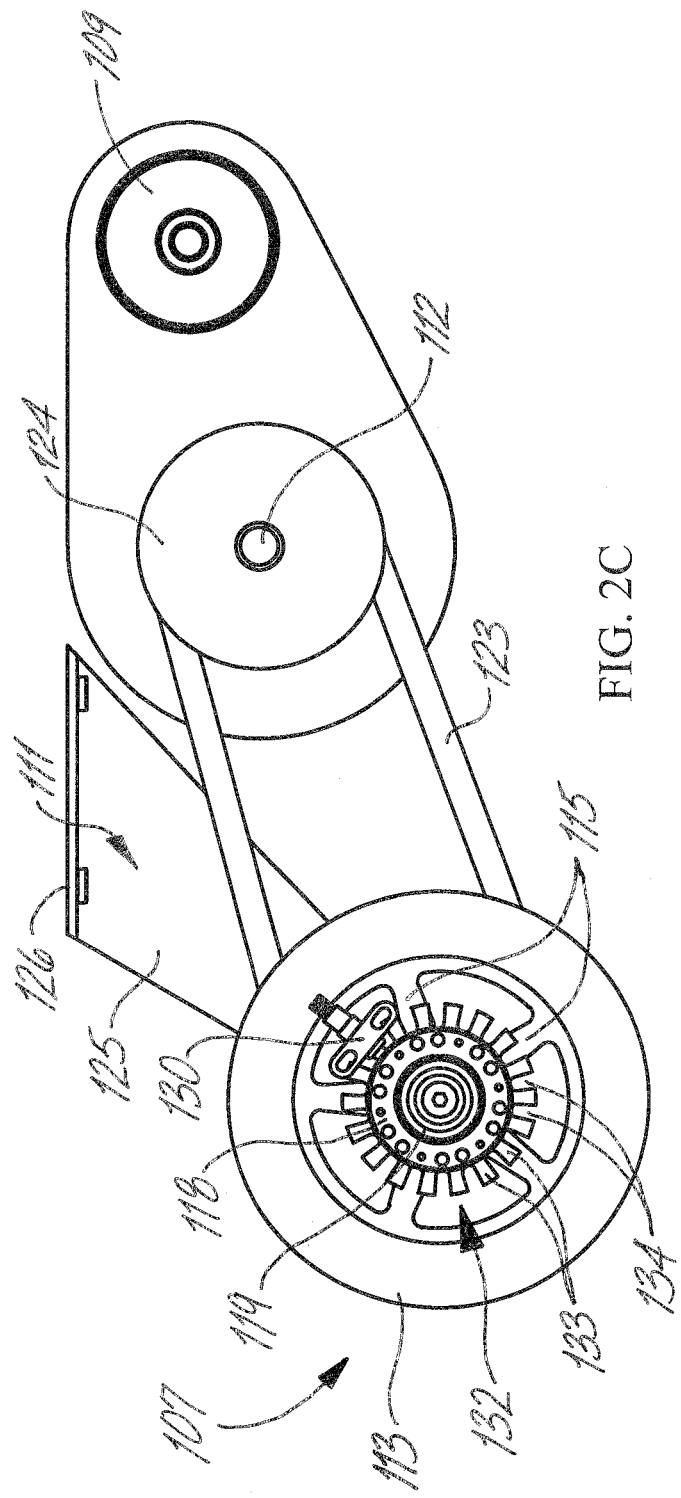

With reference now to FIGS. 2A-2C, the rear drive assembly 102 according to one embodiment of the present disclosure includes the rear wheel 107, the drive motor 109 coupled to the rear wheel 107, and a pair of support brackets 110, 111 on opposite sides of the rear wheel 107 coupling the rear wheel 107 to the deck 101. The drive motor 109 may be any suitable type of motor, such as, for instance, an electric motor (e.g., a brushed or brushless DC motor). In one embodiment, the drive motor 109 may be coupled to a gear reduction system having any suitable gear ratio depending on the desired torque and rotational speed of an output drive shaft 112 of the drive motor 109.

Still referring to the embodiment illustrated in FIGS. 2A-2C, the rear wheel 107 includes an outer annular tread portion 113, a central hub 114, and a plurality of spokes 115 interconnecting the hub 114 and the annular tread portion 113. As used throughout the present disclosure, the term "plurality" means two or more unless expressly stated otherwise. In an alternate embodiment, the rear wheel 107 may be provided without the spokes 115 and the hub 114 may be directly connected to the tread portion 113. The rear wheel 107 may be made out of any suitably durable material. Additionally, the rear wheel 107 may be either made out of a single material or several different materials. For instance, in one embodiment, the annular tread portion 113 may be made out of a first material (e.g., urethane) and the hub 114 and the spokes 115 may be made out of a second material different than the first material (e.g., plastic or metal). Additionally, the rear wheel 107 may be either a single unitary component formed by any suitable process (e.g., molding, machining, or additive manufacturing) or a plurality of components separately formed and coupled together by any suitable process (e.g., friction fitting, bonding, welding, and/or mechanical fastening).

As illustrated in FIGS. 2A-2C, the hub 114 of the rear wheel 107 defines a central opening 116 configured to receive a rear axle 117 (e.g., a rod or tube) defining an axis about which the rear wheel 107 is configured to rotate. In the illustrated embodiment, the rear drive assembly 102 also includes a flanged bushing 118 and a radial bearing 119 received (e.g., press-fit) into a central opening 120 in the flanged bushing 118. The flanged bushing 118 is coupled to one side of the hub 114 of the rear wheel 107. Additionally, a portion of the flanged bushing 118 is received in the central opening 116 in the hub 114 of the rear wheel 107. The rear drive assembly 102 also includes a rear pulley 121 coupled to a side of the rear wheel 107 opposite the flanged bushing 118 (i.e., the flanged bushing 118 and the rear pulley 121 are disposed on opposite sides of the rear wheel 107). The rear drive assembly 102 also includes a radial bearing received (e.g., press-fit) into a central opening in the rear pulley 121. The rear axle 117 extends through the radial bearing 119 in the flanged bushing 118, through the central opening 116 of the rear wheel 107, and through the radial bearing in the rear pulley 121. Additionally, opposite ends of the rear axle 117 are coupled to the support brackets 110, 111 by any suitable mechanism, such as, for instance, with fasteners 122 (e.g., rivets, screws, or bolts). Accordingly, the radial bearings are coupled to the support brackets 110, 111 by the rear axle 117.

The rear pulley 121 is operatively coupled to the output shaft 112 of the drive motor 109 by any suitable mechanism, such as, for instance, a belt (e.g., a smooth or toothed belt) or a chain 123. In the illustrated embodiment, the belt or chain 123 extends around the rear pulley 121 coupled to the rear wheel 107 and a drive pulley 124 coupled to the output shaft 112 of the drive motor 109. Accordingly, in operation, the drive motor 109 drives the belt or chain 123 to rotate the rear pulley 121 and the rear wheel 107 and thereby accelerate the motorized vehicle 100. In one or more alternate embodiments, the drive motor 109 may be coupled to the rear wheel 107 in any other suitable manner. For instance, in one embodiment, the output shaft 112 of the drive motor 109 may be directly coupled to the rear axle 117. Additionally, in one or more alternate embodiments, the drive motor 109 may have any other suitable arrangement relative to the rear wheel 107. For instance, in one embodiment, the drive motor 109 may be built into the rear wheel 107 (e.g., the drive motor 109 may be recessed in the hub 114 of the rear wheel 107). In the illustrated embodiment, the rotation of the rear wheel 107 also synchronously rotates the flanged bushing 118 that is coupled to the hub 114 of the rear wheel 107, the significance of which is described below.

Still referring to the embodiment illustrated in FIGS. 2A-2C, the support brackets 110, 111 are configured to sufficiently space the rear wheel 107 below the deck 101 (see FIG. 1A) such that the rear wheel 107 does not contact the deck 101 of the motorized vehicle 100. In the illustrated embodiment, each of the support brackets 110, 111 includes a triangular plate 125 and a flange 126 extending along an upper end of the triangular plate 125. In one embodiment in which the motorized vehicle 100 is in a neutral position, as shown in FIG. 1B, the flanges 126 may be horizontal or substantially horizontal and the triangular plates 125 may be vertical or substantially vertical. Each flange 126 includes a plurality of openings 127 configured to receive fasteners 128 (e.g., countersunk screws) (see FIG. 1B) coupling the support brackets 110, 111 to the deck 101. In one or more alternate embodiments, the support brackets 110, 111 may be coupled to the deck 101 by any other suitable mechanism, such as, for instance, by bonding or welding. Additionally, a lower end of each of the triangular plates 125 defines an opening 129. The openings 129 in the lower ends of the triangular plates 125 are configured to receive opposite ends of the rear axle 117 (i.e., the rear axle 117 extends through the opening 129 in the first support bracket 110, through the radial bearing 119 in the flanged bushing 118, through the central opening 116 in the hub 114 of the rear wheel 107, through the radial bearing in the rear pulley 121, and through the opening 129 in the second support bracket 111).

In the embodiment illustrated in FIGS. 2A-2C, the rear drive assembly 102 also includes a speed sensor 130 fixedly coupled to one of the support brackets 110. In the illustrated embodiment, one of the support brackets 110 includes a pair of openings 131 configured to receive fasteners (e.g., rivets) coupling the speed sensor 130 to the support bracket 110. The speed sensor 130 may be any suitable type of sensor, such as, for instance, a magnetic speed sensor or an optical speed sensor. In the illustrated embodiment, the rear drive assembly 102 also includes a rotor 132 coupled to the flanged bushing 118, which, as described above, is configured to rotate synchronously with the rear wheel 107. In one embodiment, the rotor 132 includes a plurality of teeth 133 circumferentially spaced at regular intervals. The rotor 132 also defines a plurality of notches or slits 134 between adjacent teeth 133. In the illustrated embodiment, the speed sensor 132 is coupled to the support bracket 110 that is proximate to the flanged bushing 118 and the rotor 132 (i.e., the support bracket 110 to which the speed sensor 130 is coupled faces the same side of the rear wheel 107 as do the flanged bushing 118 and the rotor 132).

The speed sensor 130 is configured to detect the rotational speed of the rear wheel 107 by measuring the frequency at which the teeth 133 and/or the slits 134 on the rotor 132 pass the speed sensor 130. For instance, in an embodiment in which the speed sensor 130 is an optical speed sensor emitting a light beam, the light beam is alternately obstructed by the teeth 133 on the rotor 132 and allowed to pass through the slits 134 in the rotor 132. In one embodiment, a phototransistor positioned on the opposite side of the rotor 132 as the speed sensor 130 is configured to measure the frequency with which the light beam generated by the optical speed sensor 130 passes through the slits 134 in the rotor 132. Alternately, photosensors in the optical speed sensor 130 may detect the frequency with which the light beam is reflected off of the teeth 133 and back into the optical speed sensor 130. The detected frequency with which the light beam either reflects off the teeth 133 of the rotor 132 or passes through the slits 134 in the rotor 132 corresponds to the rotational velocity of the rear wheel 107. In another embodiment, the rotor 132 may be a flat plate that includes a plurality of regularly spaced markings configured to be detected by the optical speed sensor 130. In an embodiment in which the speed sensor 130 in a magnetic speed sensor generating a magnetic field, the rotor 132 is ferromagnetic such that the teeth 133 on the rotor 132 are configured to alter the magnetic field/flux generated by the magnetic speed sensor 130. The frequency with which the magnetic field of the magnetic speed sensor 130 is altered by the rotating teeth 133 corresponds to the rotational velocity of the rear wheel 107. Additionally, in one embodiment, the speed sensor 130 may send an output signal to a microprocessor in the electronics housing 106 (see FIG. 1A). In another embodiment, the speed sensor 130 may be a reed switch. The microprocessor may be programmed with an algorithm to determine the linear velocity of the motorized vehicle 100 based on the rotational velocity of the rear wheel 107 and the size of the rear wheel 107.

In one or more alternate embodiments, the rear drive assembly 102 may not include a speed sensor for determining the rotational velocity and/or the linear velocity of the rear wheel 107. For instance, in one embodiment, the drive motor 109 may be a multiple phase brushless motor and the microprocessor in the electronics housing 106 may be configured to read the electromotive force ("emf") pulses on the unpowered phases of the brushless drive motor 109 to determine the linear velocity and/or the rotational velocity of the rear wheel 107 (e.g., the microprocessor may be configured to measure the commutation of the brushless drive motor 109). Accordingly, the linear velocity and/or the rotational velocity of the rear wheel 107 may be determined with or without a speed sensor and may be determined either directly (e.g., by measuring the rotational speed of the rotor 132 coupled to the rear wheel 107) or indirectly (e.g., by measuring output signals from the drive motor 109). Additionally, in one embodiment, the drive motor 109 may include one or more built in sensors (e.g., a Hall effect sensor), which are used by a motor controller to electronically commutate the drive motor 109. The microprocessor may be configured to read the output from these sensors built into the drive motor 109 to determine the rotational velocity and/or linear velocity of the rear wheel 107.

With reference now to the embodiment illustrated in FIGS. 3A-3E, the footpad assembly 104 includes a footpad 140, a support mount 141, an upper spring 142 and a lower spring 143 disposed on opposite sides of the support mount 141, a bearing 144 configured to rotationally support the footpad 140, a securing member 145 configured to secure the footpad 140 to the support mount 141, a rotational position sensor 146, and a lower cover 147 configured to support the lower spring 143 and protect the rotational position sensor 146. The lower cover 147 and the rotational position sensor 146 are omitted in FIG. 3E to more clearly reveal the other components of the footpad assembly 104.

Figure 3A:
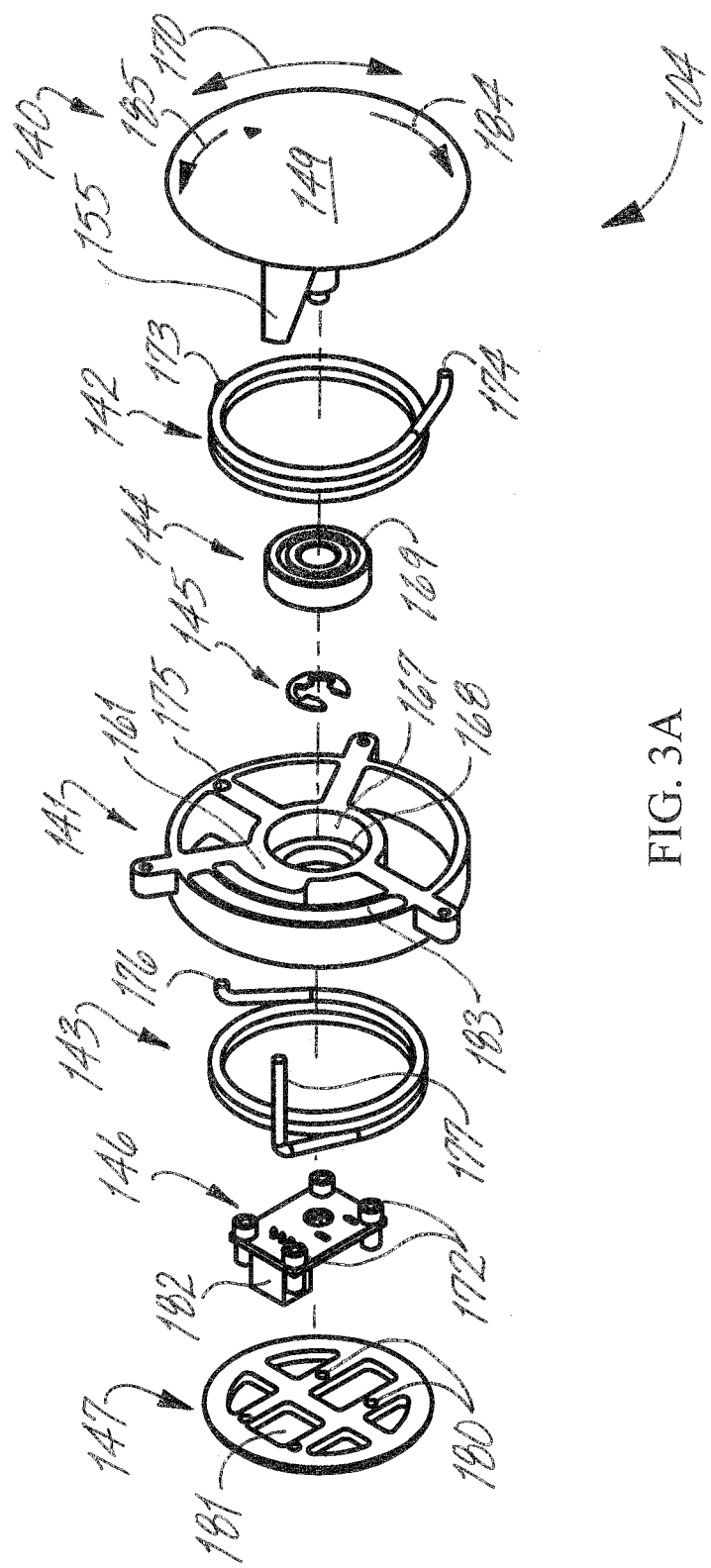
FIGS. 3A-3E are an exploded perspective view, a top view, a side view, a first bottom view, and a second bottom view, respectively, of a footpad assembly according to one embodiment of the present disclosure.
Figure 3C:
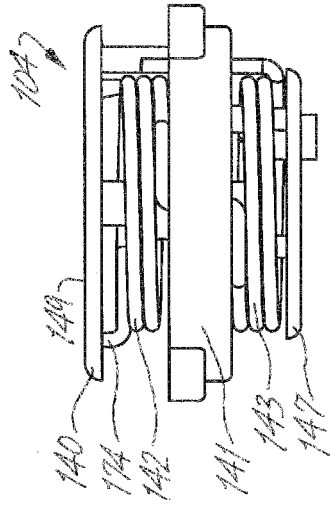
Figure 4A:
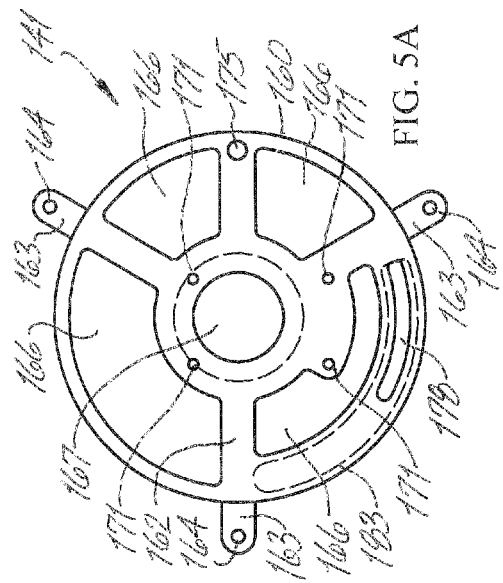
FIGS. 4A and 4B are a bottom view and a bottom perspective view, respectively, of a footpad according to one embodiment of the present disclosure.
Figure 4B:
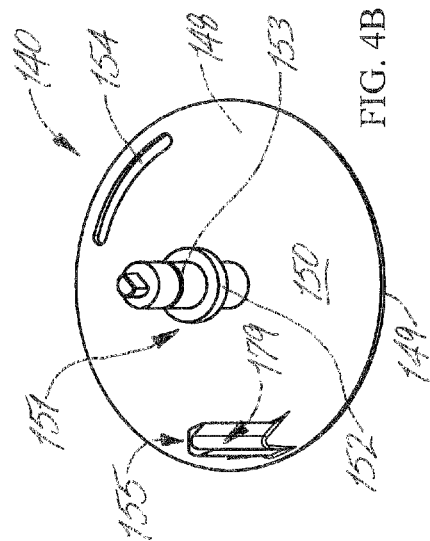
Figures 8C, 8D:
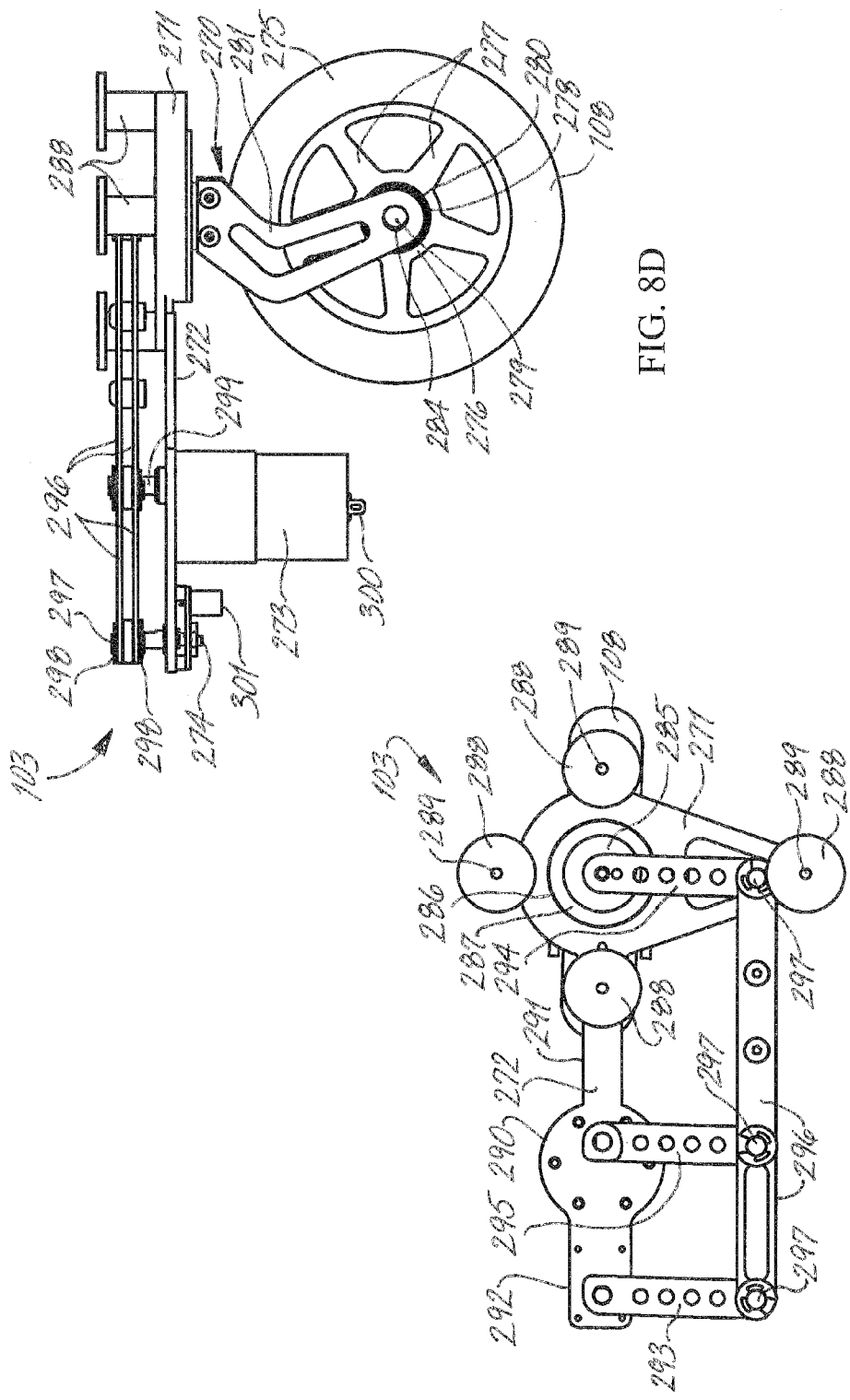

With reference now to the embodiment illustrated in FIGS. 4A and 4B, the footpad 140 includes a circular plate 148 having an outer surface 149 and an inner surface 150 opposite the outer surface 149. Although in the illustrated embodiment the outer surface 149 is flat or substantially flat, in one or more alternate embodiments the outer surface 149 may have any other suitable shape, such as, for instance, a convex or concave shape. In the illustrated embodiment, the footpad 140 also includes a central projection 151 (e.g., a cylindrical rod or pin) extending down from the inner surface 150 of the circular plate 148 and an annular flange 152 extending around the central projection 151. The central projection 151 also defines an annular notch 153 configured to receive a portion of the securing member 145 (see FIG. 3A) securing the footpad 140 to the support mount 141. Additionally, in the illustrated embodiment, the inner surface 150 of the footpad 140 defines an arcuate notch or groove 154 extending around a portion of the periphery of the footpad 140 and a U-shaped projection 155 extending down from the inner surface 150 of the circular plate 148, the significance of both of which is described below. The footpad 140 may be made out of any suitably durable material, such as, for instance, metal, plastic, rubber, or any combination thereof.

As illustrated in FIG. 1B, the footpad 140 is rotatably received in an opening 156 (e.g., a hole) in the deck 101 such that the upper surface 149 of the footpad 140 is exposed to a user standing on an upper surface 157 of the deck 101. Accordingly, the upper surface 149 of the footpad 140 is accessible by a user standing on the upper surface 157 of the deck 101, which facilitates actuation (i.e., rotation) of the footpad 140 by the user to either accelerate or decelerate the motorized vehicle 100. Additionally, in one embodiment the upper surface 149 of the footpad 140 may be flush or substantially flush with the upper surface 157 of the deck 101, although in one or more alternate embodiments the upper surface 149 of the footpad 140 may project above the upper surface 157 of the deck 101 or may be at least partially recessed below the upper surface 157 of the deck 101. Additionally, in one embodiment, the upper surface 149 of the footpad 140 may include one or more friction-inducing surface features configured to prevent the user's foot from inadvertently slipping off of the footpad 140, such as, for instance, a knurled surface, an etching, striations (e.g., ridges), and/or a coating.

Figure 5A:
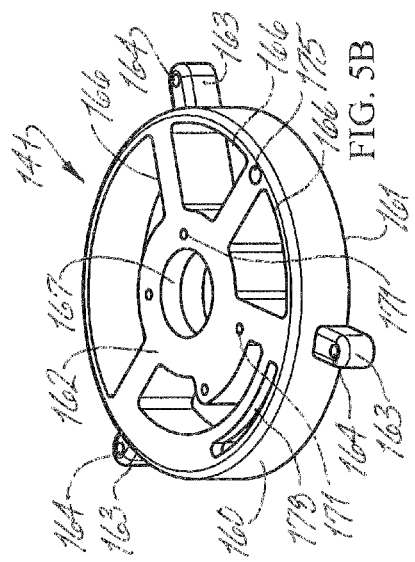
FIGS. 5A and 5B are a bottom view and a bottom perspective view, respectively, of a support mount according to one embodiment of the present disclosure.
Figure 5B:
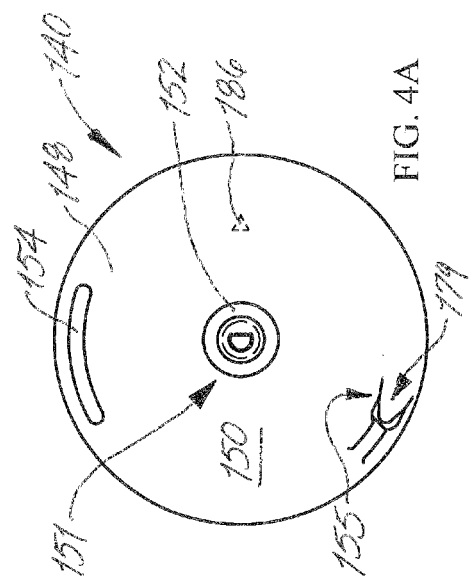

With reference now to the embodiment illustrated in FIGS. 5A and 5B, the support mount 141 includes a disk 160 having an upper surface 161 and a lower surface 162 opposite the upper surface 161. The support mount 141 also includes a plurality of ears or lobes 163 circumferentially disposed around a periphery of the disk 160. In the illustrated embodiment, each of the lobes 163 projects radially outward from the disk 160. Each of the lobes 163 also defines an opening 164 (e.g., a smooth or threaded bore) configured to receive a fastener 165 (e.g., a screw) coupling the support mount 161 to the deck 101, as illustrated in FIG. 1B. In the illustrated embodiment, the fasteners 165 are countersunk screws such that the screws do not project above the upper surface 157 of the deck 101 (e.g., the countersunk screws 165 are substantially flush or recessed in the upper surface 157 of the deck 101), although any other suitable type of fasteners 165 may be used to couple the support mount 141 to the deck 101. Additionally, although in the illustrated embodiment the support mount 141 includes three lobes 163, in one or more alternate embodiments, the support mount 141 may include any other suitable number of lobes 163, such as, for instance, from two to ten lobes, depending, for instance, on the desired attachment strength between the support mount 141 and the deck 101. In another embodiment, the support mount 141 may be provided without the lobes 163 and the openings 164 may be defined in the disk 160. Additionally, in the illustrated embodiment, the support mount 141 defines a plurality of openings 166 in the disk 160 configured to reduce the weight of the support mount 141.

With continued reference to the embodiment illustrated in FIGS. 5A and 5B, the support mount 141 also defines a central opening 167 (e.g., a hole) extending between the upper and lower surfaces 161, 162 of the disk 160. The central opening 167 is configured to receive a portion of the central projection 151 on the footpad 140 (i.e., the projection 151 on the footpad 140 extends through the central opening 167 in the support mount 141). Additionally, in the illustrated embodiment, an upper portion of the central opening 167 is larger than a lower portion of the central opening 167. Accordingly, an annular shoulder 168 is defined between the upper and lower portions of the central opening 167 in the support mount 141, as best shown in FIG. 3A. The bearing 144 (e.g., an axial bearing) (see FIG. 3A) is configured to be received in the larger upper portion of the central opening 167 and is configured to abut against the shoulder 168 formed in the support mount 141 (i.e., the shoulder 168 in the support mount 141 is configured to support the bearing 144). In one embodiment, an upper surface 169 of the bearing 144 may be flush or substantially flush with the upper surface 161 of the support mount 141 when the bearing 144 is supported on the shoulder 168 in the support mount 141.

Additionally, the annular flange 152 on the central projection 151 of the footpad 140 is configured to be rotatably supported on the upper surface 169 of the bearing 144. The engagement between the annular flange 152 on the footpad 140 and the bearing 144 is configured to facilitate the rotation (arrow 170) of the footpad 140 relative to the support mount 141 (i.e., the bearing 144 is configured to enable the footpad 140 to freely rotate (arrow 170) relative to the deck 101 and the support mount 141 fixedly coupled to the deck 101). Additionally, the engagement between the annular flange 152 on the footpad 140 and the bearing 144 is configured to fix the height of the footpad 140 relative to the deck 101 (e.g., the engagement between the annular flange 152 on the footpad 140 and the bearing 144 in the support mount 141 is configured to prevent the footpad 140 from sliding down through the opening 156 in the deck 101 of the motorized vehicle 100, for instance, when the user places his rear foot onto the footpad 140).

Figure 3E:
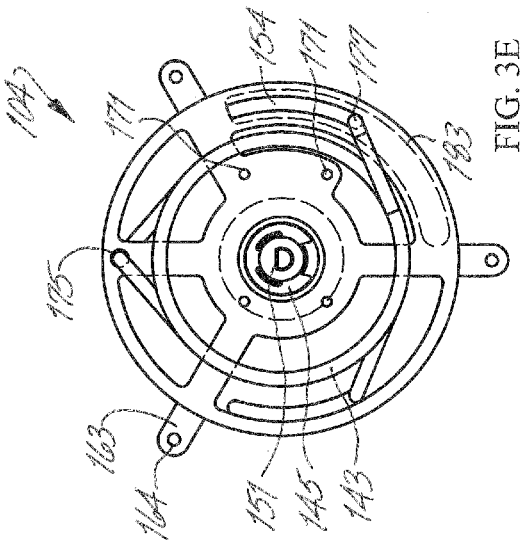
Figure 3B:
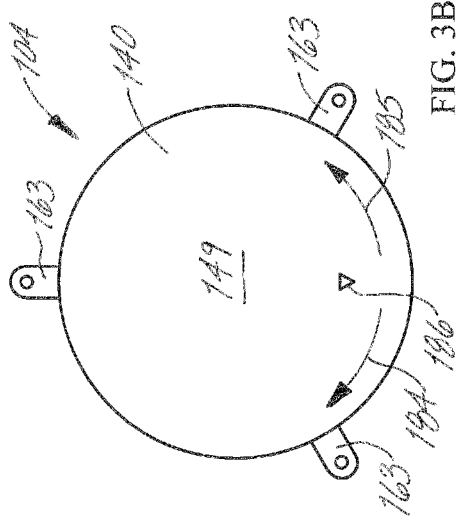

As illustrated in FIGS. 3A and 3E, the central projection 151 on the footpad 140 extends through the central opening 167 in the support mount 141 such that the annular notch 153 in the central projection 151 is exposed below the lower surface 162 of the support mount 141. The securing member 145, which is partially received in the annular notch 153 in the central projection 151, is configured to contact the lower surface 162 of the support mount 141. The engagement between the securing member 145 and the lower surface 162 of the support mount 141 is configured to prevent the footpad 140 from sliding out through the opening 156 in the deck 101 (e.g., when the user steers the motorized vehicle 100 by rolling the deck 101 from side to side). Additionally, in one embodiment, the distance between the annular flange 152 and the annular notch 153 in the central projection 151 of the footpad 140 is equal or substantially equal to a distance between the upper surface 169 of the bearing 144 and the lower surface 162 of the support mount 141 such that the footpad 140 cannot move up or down relative to the support mount 141 or the deck 101. The securing member 145 may be any suitable mechanism for retaining or restraining the footpad 140, such as, for instance, a C-clip, an E-clip, a retaining ring, a clamp, a shaft collar, or a cotter pin.

With reference now to FIGS. 3A and 5B, the lower surface 162 of the support mount 141 also defines a plurality of openings 171 (e.g., four holes) configured to receive fasteners coupling the rotational position sensor 146 to the support mount 141. In the illustrated embodiment, the rotational position sensor 146 includes a plurality of bushings or standoffs 172 configured to receive the fasteners coupling the sensor 146 to the support mount 141. Additionally, in the illustrated embodiment, the central projection 151 on the footpad 140 extends through the central opening 167 in the support mount 141 and engages the angular position sensor 146. For instance, in one embodiment, the angular position sensor 146 is a rotary potentiometer that includes a circular track and a lower end of the central projection 151 includes a wiper that contacts the track. A constant voltage is supplied across the track of the potentiometer. As the footpad 140 rotates (arrow 170), the voltage output from the potentiometer varies in proportion to the angular position of the central projection 151 on the footpad 140 (i.e., the potentiometer functions as an adjustable voltage divider). In this manner, the angular position sensor 146 is configured to measure or detect the angular position of the footpad 140. In one or more alternate embodiments, the central projection 151 on the footpad 140 may not need to contact the angular position sensor 146 depending on the type of angular position sensor 146. For instance, in one embodiment, the angular position sensor 146 may be a non-contact Hall effect sensor.

Still referring to the embodiment illustrated in FIG. 3A, the upper spring 142 is supported on the upper surface 161 of the support mount 141. Additionally, the upper spring 142 is a torsion coil spring having a downwardly turned lip 173 on one end of the spring 142 and an upwardly turned lip 174 on an opposite end of the spring 142. The downwardly turned lip 173 is configured to extend down into an upper end of an opening 175 in the support mount 141 to fixedly couple the end of the upper spring 142 to the support mount 141. In one or more alternate embodiments, the end of the upper spring 142 may be fixedly coupled to the support mount 141 by any other suitable mechanism, such as, for instance, bonding, welding, or mechanical fastening. The upwardly turned lip 174 on the upper spring 142 is configured to extend up into the arcuate groove 154 in the footpad 140 (see FIGS. 4A and 4B). Additionally, in one embodiment, when the footpad 140 is in a neutral position, the upwardly turned lip 174 on the upper spring 142 is received in one end of the arcuate notch 154 in the lower surface 150 of the footpad 140 (e.g., in the neutral position, before the footpad 140 has been rotated to accelerate the motorized vehicle 100, the upwardly turned lip 174 on the upper spring 142 is located at one end of the arcuate notch 154 in the lower surface 150 of the footpad 140).

With continued reference to the embodiment illustrated in FIG. 3A, the lower spring 143 is disposed below the inner surface 162 of the support mount 141. Additionally, the lower spring 143 is a torsion coil spring having first and second upwardly turned lips 176, 177 on opposite ends of the lower spring 143. One of the upwardly turned lips 176 on the lower spring 143 is configured to extend up into a lower end of the opening 175 in the support mount 141 to fixedly couple the end of the lower spring 143 to the support mount 141. The other upwardly turned lip 177 on the lower spring 143 is configured to extend up through an arcuate opening 178 (see FIGS. 5A and 5B) in the support mount 141 and into a U-shaped recess 179 (see FIGS. 4A and 4B) defined by the U-shaped projection 155 on the footpad 140. The upwardly turned lip 177 on the lower spring 143 is adjacent in the U-shaped projection 155 on the footpad 140, illustrated in FIGS. 4A and 4B. Accordingly, in the illustrated embodiment, the upwardly turned lip 177 that extends up into the U-shaped recess 179 defined by the U-shaped projection 155 on the footpad 140 is longer than the upwardly turned lip 176 on the lower spring 143 that extends into the opening 175 in the support mount 141.

Figure 3D:
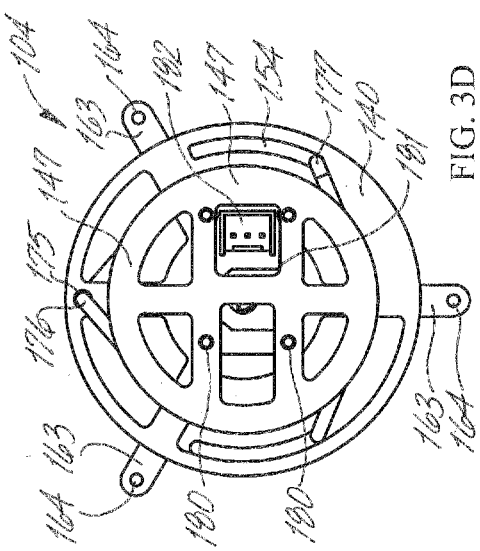

With continued reference to the embodiment illustrated in FIG. 3A, the lower cover 147 is configured to support the lower spring 143. In the illustrated embodiment, the lower cover 147 is a circular disk. Additionally, the lower cover 147 defines a plurality of openings 180 (e.g., holes) configured to receive fasteners coupling the lower cover 147 to the support mount 141. In the illustrated embodiment, the fasteners coupling the lower cover 147 to the support mount 141 also couple the rotational position sensor 146 to the support mount 141. In the illustrated embodiment, the fasteners extend through the openings 180 in the lower cover 147, through the plurality of bushings or standoffs 172 on the rotational position sensor 146, and into the openings 171 in the lower surface 162 of the support mount 141. The lower cover 147 also defines an opening 181 configured to expose an electrical connector 182 on the rotational position sensor 146, as illustrated in FIG. 3D. The electrical connector 182 is configured to electrically couple the rotational position sensor 146 to the microprocessor in the electronics housing 106 (see FIG. 1A).

In the embodiment illustrated in FIGS. 3A and 4B, the upper surface 161 of the support mount 141 also defines an arcuate channel 183 configured to receive a lower portion of the U-shaped projection 155 on the footpad 140. The engagement between the U-shaped projection 155 on the footpad 140 and the arcuate channel 183 in the support mount 141 is configured to support and guide the footpad 140 as it is rotated (arrow 170) to accelerate and decelerate the motorized vehicle 100. In one embodiment, when the footpad 140 is in the neutral position (i.e., before the user has rotated the footpad 140 to accelerate the motorized vehicle 100), the U-shaped projection 155 on the footpad 140 is located in a middle portion of the arcuate channel 183 in the support mount 141.

FIGS. 7A-7E illustrate a user actuating the footpad 140 to either accelerate the motorized vehicle 100 or decelerate the motorized vehicle 100. In particular, FIGS. 7A-7D illustrate a user operating the footpad 140 while standing in a "goofy" stance (i.e., with the user's left foot proximate a rear of the deck 100 and the user's right foot proximate a front of the deck 100) and FIGS. 7E-7H illustrate a user operating the footpad 140 while standing in a "regular" stance (i.e., with the user's right foot proximate the rear of the deck 100 and the user's left foot proximate the front of the deck 100). In operation, a user standing on the deck 101 may first place his rear foot onto the upper surface 149 of the footpad 140, as illustrated in FIGS. 7B and 7F. If the user is standing in a goofy stance, the user may then adduct his rear foot to rotate the footpad 140 in a first direction (arrow 184) or abduct his foot to rotate the footpad 140 in a second direction (arrow 185) opposite the first direction, as illustrated in FIGS. 7C and 7D, respectively. If the user is standing in a regular stance, the user may adduct his rear foot to rotate the footpad 140 in the second direction (arrow 185) or abduct his foot to rotate the footpad 140 in the first direction (arrow 184), as illustrated in FIGS. 7G and 7H, respectively.

As illustrated in FIG. 3A, when the footpad 140 is rotated in the first direction (arrow 184), the footpad 140 engages the upwardly turned lip 174 on the upper spring 142 and thereby winds the upper spring 142 (i.e., the upwardly turned lip 174 on the upper spring 142 is engaged by the end of the arcuate notch 154 in the footpad 140 when the footpad 140 rotates in the first direction (arrow 184)). The longer upwardly turned lip 177 on the lower spring 143 is not engaged by the footpad 140 when the footpad 140 is rotated in the first direction (arrow 184) because the U-shaped projection 155 on the footpad 140 rotates away from the longer upwardly turned lip 177 on the lower spring 143 (i.e., the lower spring 143 is not wound when the footpad 140 is rotated in the first direction (arrow 184)). When the footpad 140 is rotated in the second direction (arrow 185), the U-shaped projection 155 on the footpad 140 engages the longer upwardly turned lip 177 on the lower spring 143 and thereby winds the lower spring 143 while the upwardly turned lip 174 on the upper spring 142 freely rotates or slides in the arcuate notch 154 in the footpad 140 (i.e., the upper spring 142 is not wound when the footpad 140 is rotated in the second direction (arrow 185)). In this manner, the upper spring 142 is configured to bias the footpad 140 into the neutral position when the footpad 140 is rotated in the first direction (arrow 184) and the lower spring 143 is configured to bias the footpad 140 into the neutral position when the footpad 140 is rotated in the second direction (arrow 185). Accordingly, the restorative force supplied by either the wound upper spring 142 or the wound lower spring 143 is configured to bias the footpad 140 into the neutral position depending on the direction in which the footpad 140 is rotated.

Accordingly, the user may return the footpad 140 to the neutral position by lifting his foot off the footpad 140, as illustrated in FIGS. 7A and 7E, and thereby allowing either the upper or lower spring 142, 143 to bias the footpad 140 into the neutral position depending on the direction in which the footpad 140 was rotated. The user may alternatively return the footpad 140 to the neutral position by abducting or adducting his foot and thereby rotating the footpad 140 into the neutral position.

Additionally, in one embodiment, the arcuate opening 178 in the support mount 141 (see FIGS. 5A and 5B) may be sized such that the longer upwardly turned lip 177 on the lower spring 143 does not engage the support mount 141 (e.g., when the footpad 140 rotates in the second direction (arrow 185) such that the U-shaped projection 155 on the footpad 140 winds the lower spring 143, the longer upwardly turned lip 177 on the lower spring 143 freely moves in the arcuate opening 178 in the support mount 141). In one embodiment, the arcuate opening 178 in the support mount 141 may be sized to limit the maximum amount of travel of the longer upwardly turned lip 177 on the lower spring 143 (e.g., the longer upwardly turned lip 177 on the lower spring 143 may engage an end of the arcuate opening 178 in the support mount 141 to limit the maximum amount of rotation of the footpad 140 in the second direction (arrow 185)). Additionally, in one embodiment, the longer upwardly turned lip 177 on the lower spring 143 may engage one end of the arcuate notch 178 in the support mount 141 when the lower spring 143 is not engaged by the footpad 140 (e.g., when the footpad 140 is in the neutral position or the footpad 140 is rotating in the first direction (arrow 184)).

In one embodiment, the rotational positional sensor 146 is configured to send a pulse-width modulated (PWM) output signal to a microprocessor in the electronics housing 106 (see FIG. 1A). The voltage output from the rotational position sensor 146 varies in proportion to the angular position of the footpad 140. In one embodiment, the output signal may range from approximately −2.5V to approximately +2.5V depending on the angular position of the footpad 140, although the output signal may have any other suitable range of voltages depending on the type of rotational position sensor 146. Based on the output signal received from the rotational positional sensor 146, the microprocessor is configured to send an output signal to a controller in the electronics housing 106 that is electrically coupled to the drive motor 109. The controller is configured to adjust the power provided from the battery 105 to the drive motor 109 based on the voltage output signal received from the rotational position sensor 146. In this manner, the angular position of the footpad 140 controls the power supplied to the rear wheel 107 by the drive motor 109 and thereby controls the linear velocity of the motorized vehicle 100.

In one embodiment, rotation of the footpad 140 in the first direction (arrow 184) is configured to accelerate the motorized vehicle 100 and rotation of the footpad 140 in the second direction (arrow 185) is configured to decelerate the motorized vehicle 100. In another embodiment, rotation of the footpad 140 in the first direction (arrow 184) is configured to decelerate the motorized vehicle 100 and rotation of the footpad 140 in the second direction (arrow 185) is configured to accelerate the motorized vehicle 100. Additionally, in one embodiment, the motorized vehicle 100 may include a switch configured to enable the user to set which direction of rotation (arrows 184, 185) of the footpad 140 is configured to accelerate the motorized vehicle 100 and which direction of rotation (arrows 184, 185) is configured to decelerate the motorized vehicle 100. The user may select the desired direction of rotation (arrows 184, 185) of the footpad 140 required to accelerate the motorized vehicle 100 depending, for instance, on ergonomic considerations. For instance, when the user is standing in a "regular" stance, as illustrated in FIGS. 7E-7H, the switch may be actuated such that rotation of footpad 140 in the second direction (arrow 185) (i.e., such that the user's right foot is pointing closer toward the front of the deck 100) is configured to accelerate the motorized vehicle 100. Similarly, when the user is standing in a "goofy" stance, as illustrated in FIGS. 7A-7D, the switch may be actuated such that rotation of the footpad 140 in the first direction (arrow 184) (i.e., such that the user's left foot is pointing closer toward the front of the deck 100) is configured to accelerate the motorized vehicle 100. Although in one embodiment the motorized vehicle 100 may include a physical switch configured to select the desired direction of rotation of the footpad 140 that is configured to accelerate the motorized vehicle 100, in one or more alternate embodiments, the motorized vehicle 100 may be configured such that the desired direction of rotation of the footpad 140 that is configured to accelerate the motorized vehicle 100 may be selected remotely (e.g., the motorized vehicle 100 may include a receiver configured to receive a wireless signal (e.g., Bluetooth) from a cellular device and transmit that signal to the microprocessor in the electronics housing 106). In one or more alternate embodiments, the microprocessor may be programmed such that the direction (arrow 184 or arrow 185) in which the user first rotates the footpad 140 is configured to accelerate the motorized vehicle 100 and the opposite direction (arrow 184 or arrow 185) is configured to decelerate the motorized vehicle 100. In one or more embodiments, the drive motor 109 may be configured to actively decelerate the motorized vehicle 100 in any suitable manner, such as, for instance, with assistive braking, dynamic braking, or regenerative braking. In one or more alternate embodiments, the controller may be configured to passively brake the motorized vehicle 100 by reducing the power supplied from battery 105 to the drive motor 109.

In one embodiment, the microprocessor may be programmed not to accelerate the motorized vehicle 100 when the angular position of the footpad 140 is within a narrow range about the neutral position (e.g., approximately 1 degree or approximately 2 degrees from the neutral position). In this manner, the footpad 140 includes a "deadzone" in which relatively small rotations of the footpad 140 do not change the speed of the motorized vehicle 100. The deadzone is configured to prevent inadvertent changes to the angular position of the footpad 140 (e.g., when the motorized vehicle 100 travels over rough terrain that moves the user's foot) from changing the speed of the motorized vehicle 100.

Additionally, in one embodiment, the upper surface 149 of the footpad 140 may include indicia 186 (e.g., a symbol, a writing, or other marking) configured to indicate the neutral position of the footpad 140. For instance, in the illustrated embodiment, the upper surface 149 of the footpad 140 includes a triangular arrow 186 pointing toward the front end of the deck 101 when the footpad 140 is in the neutral position.

In one embodiment, the motorized vehicle 100 may be provided without the microprocessor, the controller, and the rotational position sensor 146 for controlling the speed of the motorized vehicle 100 based on the angular position of the footpad 140. In this embodiment, the footpad 140 may be coupled to a variable resistor (e.g., a potentiometer or a rheostat) that is electrically coupled to the drive motor 109. The variable resistor is configured to control the electrical resistance to the drive motor 109 based on the angular position of the footpad 140. In one embodiment, the variable resistor is configured to decrease the electrical resistance to the drive motor 109 as the footpad 140 is rotated away from the neutral position, thereby increasing the output of the drive motor 109 and increasing the speed of the motorized vehicle 100. Conversely, the variable resistor is configured to increase the electrical resistance to the drive motor 109 as the footpad 140 is rotated toward the neutral position, thereby decreasing the output of the drive motor 109 and decreasing the speed of the motorized vehicle 100.

With reference now to FIGS. 6A-6D, a footpad assembly 200 according to another embodiment of the present disclosure includes a footpad 201, a support bracket 202, an arm 203 coupled to the footpad 201, a rotational position sensor 204, a pair of linkages 205, 206 coupled to the arm 203, a coupling 207 coupling the linkages 205, 206 to the rotational position sensor 204, and a resilient member 208 (e.g., a spring) configured to bias the footpad 201 into a neutral position.

In the illustrated embodiment, the footpad 201 includes a circular plate 209 having an outer surface 210 and an inner surface 211. Additionally, in the illustrated embodiment, the footpad 201 also includes a central projection 212 (e.g., a cylindrical pin or rod) extending downward from the inner surface 211 of the circular plate 209. As described above with reference to the embodiment illustrated in FIG. 1A, the footpad 201 is received in the opening 156 in the deck 101 such that the outer surface 210 of the footpad 201 is exposed to enable a user to access and operate the footpad 201 while standing on the upper surface 157 of the deck 101. The outer surface 210 of the footpad 201 may be flush or substantially flush with the upper surface 157 of the deck 101, may at least partially project above the upper surface 157 of the deck 101, or may be at least partially recessed below the upper surface 157 of the deck 101. The circular plate 209 may be the same or similar to the circular plate 140 described above with reference to the embodiment of the footpad assembly 104 described above with reference to FIGS. 3A-4B.

Still referring to the embodiment illustrated in FIGS. 6A-6D, the support bracket 202 is an elongated member including a base plate 213, a pair of legs 214, 215 extending upward from opposite ends of the base plate 213, and a pair of flanges 216, 217 extending outward from respective ones of the legs 214, 215. Each of the flanges 216, 217 defines an opening 218, 219 (e.g., a hole), respectively, configured to receive a fastener (e.g., a countersunk screw) coupling the support bracket 202 to the deck 101. Additionally, in the illustrated embodiment, one of the legs 214 extends orthogonally or substantially orthogonally up from the base plate 213 and the other leg 215 is canted relative to the base plate 213, although in one or more alternate embodiments, the legs 214, 215 may extend upward from the base plate 213 at any other suitable angles. The legs 214, 215 are sized to sufficiently space the arm 203, the linkages 205, 206, the coupling 207, and the resilient member 208 below the deck 101 (e.g., together, the base plate 213 and the legs 214, 215 of the support bracket 202 define a recess 220 configured to accommodate the resilient member 208, the arm 203, and a portion of the linkages 205, 206). The base plate 213 of the support bracket 202 also includes a cylindrical flange 221. The cylindrical flange 221 defines a circular recess 222 for receiving or housing a bearing 223 (e.g., an axial bearing) configured to facilitate rotation of the footpad 201, as described in detail below.

Still referring to FIGS. 6A-6D, the footpad 201 also includes an annular flange 224 extending around a portion of the central projection 212. Additionally, in the illustrated embodiment, the annular flange 224 has a larger diameter than a lower end 225 of the central projection 212 such that a shoulder 226 is defined at a lower end of the annular flange 224. The shoulder 226 of the annular flange 224 abuts or rests on an upper surface 227 of the bearing 223. The engagement between the shoulder 226 on the central projection 212 of the footpad 201 and the bearing 223 is configured to facilitate rotation (arrow 228) of the footpad 201 relative to the support bracket 202 (i.e., the bearing 223 is configured to enable the footpad 201 to freely rotate (arrow 228) relative to the deck 101 and the support bracket 202, which is fixedly coupled to the deck 101). Additionally, the lower end 225 of the central projection 212 extends into a central opening 229 in the bearing 223. In the illustrated embodiment, the outer diameter of the lower end 225 of the central projection 212 is substantially equal to the inner diameter of the central opening 229 in the bearing 223 such that the lower end 225 of the central projection 212 engages the bearing 223. The engagement between the lower end 225 of the central projection 212 and the bearing 223 is configured to rotatably support the footpad 201.

With continued reference to the embodiment illustrated in FIGS. 6A-6D, the footpad 201 also includes an axial opening 230 (e.g., an internally threaded blind bore) extending upward from the lower end 225 of the central projection 212 (e.g., the opening 230 is coaxial with the annular flange 224 and the central projection 212 on the footpad 201). The opening 230 is configured to receive a fastener 231 (e.g., a bolt or screw) coupling the footpad 201 to the bearing 223. In the illustrated embodiment, the fastener 231 extends up through an opening 232 in a lower end 233 of the cylindrical flange 221 and into the axial opening 230 in the lower end 225 of the central projection 212. The head of the fastener 231 is supported on a lower surface 234 of the bearing 223 by a washer 235.

Still referring to the embodiment illustrated in FIGS. 6A-6D, an inner end 240 of the arm 203 of the footpad assembly 200 extends out from the annular flange 224 on the central projection 212 of the footpad 201. Although in the illustrated embodiment the footpad 201 and the arm 203 are integrally formed, in one or more alternate embodiments, the footpad 201 and the arm 203 may be formed separately and coupled together by any suitable process, such as, for instance, bonding, welding, adhering, or mechanical fastening. An outer end 241 of the arm 203 is coupled to the resilient member 208. In the illustrated embodiment, the resilient member 208 is a spring extending between the outer end 241 of the arm 203 and one of the legs 214 of the support bracket 202. The spring 208 may be coupled to the arm 203 and the leg 214 on the support bracket 202 by any suitable mechanism, such as, for instance, bonding, welding, or mechanical fastening. In the illustrated embodiment, hooks 242, 243 on opposite ends of the spring 208 extend through one or more openings 244, 245 (e.g., holes) in the arm 203 and the leg 214, respectively.

The outer end 241 of the arm 203 is also rotatably coupled to the pair of linkages 205, 206. In the illustrated embodiment, the linkages 205, 206 are disposed on opposite sides of the arm 203 (i.e., the linkages 205, 206 are located above and below the arm, respectively). The linkages 205, 206 are rotatably coupled to the arm 203 by a pin 246 extending through aligned openings in the linkages 205, 206 and the arm 203, respectively. Additionally, in the illustrated embodiment, the footpad assembly 200 includes a pair of upper and lower securing members 250, 251 configured to secure the pin 246 to the arm 203 and the linkages 205, 206 (i.e., the securing members 250, 251 are configured to prevent the pin 246 from inadvertently disengaging the arm 203 and the linkages 205, 206). Although in the illustrated embodiment, the footpad assembly 200 includes a pair of linkages 205, 206, in one or more alternate embodiments, the footpad assembly 200 may include any other suitable number of linkages, such as, for instance, a single linkage. Ends of the linkages 205, 206 opposite the arm 203 are rotatably coupled to an end of the coupling 207. In the illustrated embodiment, the linkages 205, 206 and the coupling 207 are rotatably coupled together by a pin 252 extending through aligned openings in the linkages 205, 206 and the coupling 207. A pair of upper and lower securing members 253, 254 coupled to opposite ends of the pin 252 is configured to prevent the pin 252 from inadvertently disengaging the linkages 205, 206 and the coupling 207. Additionally, an end of the coupling 207 opposite the linkages 205, 206 is coupled to the rotational position sensor 204. The securing members 250, 251, 253, 254 may be any suitable mechanisms for securing the linkages 205, 206 to the pins 246, 252, such as, for instance, C-clips, E-clips, retaining rings, clamps, shaft collars, cotter pins, or any combination thereof.

In the illustrated embodiment, the rotational position sensor 204 is coupled to a printed circuit board (PCB) 255. The PCB 255 includes a plurality of bushings or standoffs 256 configured to receive fasteners coupling the rotational positional sensor 204 and the PCB 255 to the deck 101. As described above with reference to the embodiment of the footpad assembly 104 illustrated in FIGS. 3A-3E, the rotational position sensor 204 may be any suitable type of sensor, such as, for instance, a rotary potentiometer or a non-contact Hall effect sensor.

As described above with reference to FIGS. 7A-7E, a user may actuate the footpad 201 to either accelerate the motorized vehicle 100 or decelerate the motorized vehicle 100. In operation, a user standing on the deck 101 may place his rear foot onto the footpad 201 and then adduct or abduct his rear foot to rotate the footpad 201 in a first direction (arrow 257) or a second direction (arrow 258). As illustrated in FIGS. 6A and 6C, when the footpad 201 rotates in the first direction (arrow 257), the arm 203 coupled to footpad 201 pulls on the pair of linkages 205, 206 coupled to the outer end 241 of the arm 203. Additionally, the movement of the linkages 205, 206 is configured to rotate the coupling 207 coupled to the rotational position sensor 204. Similarly, when the footpad 201 rotates in the second direction (arrow 258), the arm 203 coupled to the footpad 201 pushes on the pair of linkages 205, 206, which causes the coupling 207 to rotate. Accordingly, the rotation of the footpad 201 is transmitted to the rotational position sensor 204 through the arm 203, the pair of linkages 205, 206, and the coupling 207.

As the footpad 201 rotates in either the first or second direction (arrows 257, 258), the rotational positional sensor 204 is configured to send a pulse-width modulated (PWM) output signal to a microprocessor in the electronics housing 106 (see FIG. 1A). The voltage output from the rotational position sensor 204 varies in proportion to the angular position of the footpad 201. In one embodiment, the output signal may range from approximately −2.5V to approximately +2.5V depending on the angular position of the footpad 201, although the output signal may have any other suitable range of voltages depending on the type of rotational position sensor 204. In this manner, the angular position sensor 204 is configured to measure or detect the angular position of the footpad 201. Based on the output signal received from the rotational positional sensor 146, the microprocessor is configured to send an output signal to a controller in the electronics housing 106 that is electrically coupled to the drive motor 109. The controller is configured to adjust the power provided from the battery 105 to the drive motor 109 based on the voltage output signal received from the rotational position sensor 204. In this manner, the angular position of the footpad 201 controls the power supplied to the rear wheel 107 by the drive motor 109 and thereby controls the linear velocity of the motorized vehicle 100. Accordingly, in one or more embodiments, the drive motor 109 may be configured to drive the rear wheel 107 at a first speed when the footpad 201 is in a first angular position and to accelerate the rear wheel 107 to a second speed when the footpad 201 is rotated into a second angular position greater than the first angular position. The drive motor 109 is also configured to passively decelerate the rear wheel 107 when the footpad 201 is rotated into a third angular position less than the second angular position.

In one embodiment, rotation of the footpad 201 in the first direction (arrow 257) is configured to accelerate the motorized vehicle 100 and rotation of the footpad 201 in the second direction (arrow 258) is configured to decelerate the motorized vehicle 100. In another embodiment, rotation of the footpad 201 in the first direction (arrow 257) is configured to decelerate the motorized vehicle 100 and rotation of the footpad 201 in the second direction (arrow 258) is configured to accelerate the motorized vehicle 100. Additionally, as described above with reference to the embodiment of the footpad assembly 104 illustrated in FIGS. 3A-3E, the motorized vehicle 100 may include a switch (e.g., a physical switch or a receiver configured to receive and transmit a wireless signal to the microprocessor in the electronics housing 106) configured to enable the user to set which direction of rotation (arrows 257, 258) of the footpad 201 is configured to accelerate the motorized vehicle 100 and which direction of rotation (arrows 257, 258) is configured to decelerate the motorized vehicle 100. Additionally, in one or more alternate embodiments, the microprocessor may be programmed such that the direction (arrow 257 or arrow 258) in which the user first rotates the footpad 201 is configured to accelerate the motorized vehicle 100 and the opposite direction (arrow 257 or arrow 258) is configured to decelerate the motorized vehicle 100.

Additionally, as illustrated in FIGS. 6A and 6B, when the footpad 201 rotates in the first direction (arrow 257) or the second direction (arrow 258), the arm 203 coupled to the footpad 201 pulls and elongates the resilient member 208 (e.g., the spring) coupled to the outer end 241 of the arm 203. The restorative force provided by the elongated resilient member 208 is configured to return the footpad 201 to the neutral position when the user lifts his foot off of the footpad 201.

With reference now to FIGS. 8A-8D, the front steering assembly 103 according to one embodiment of the present disclosure includes the front wheel 108, a steering knuckle 270 coupled to the front wheel 108, a support bracket 271, a support plate 272, a steering motor 273, an angular position sensor 274 configured to measure the steering angle of the front wheel 108, and a series of linkages coupling the steering motor 273 to the front wheel 108 and coupling the angular position sensor 274 to the front wheel 108.

In the illustrated embodiment, the front wheel 108 includes an annular tread portion 275, a central hub 276, and a plurality of spokes 277 interconnecting the hub 276 and the tread 275. In an alternate embodiment, the front wheel 108 may be provided without the spokes 277 and the hub 276 may be directly connected to the tread 275. As described above with reference to the rear wheel, the front wheel 108 may be made out of any suitably durable material. Additionally, the front wheel 108 may be either made out of a single material or several different materials. For instance, in one embodiment, the annular tread portion 275 may be made out of a first material (e.g., urethane) and the hub 276 and the spokes 277 may be made out of a second material different than the first material (e.g., plastic or metal). Additionally, the front wheel 108 may be either a single unitary component formed by any suitable process (e.g., molding, machining, or additive manufacturing) or a plurality of components separately formed and coupled together by any suitable process (e.g., friction fitting, bonding, welding, and/or mechanical fastening).

Still referring to the embodiment illustrated in FIGS. 8A-8D, the hub 276 of the front wheel 108 defines a central opening 278 configured to receive a front axle 279 (e.g., a rod or tube) defining an axis about which the front wheel 108 is configured to rotate. In the illustrated embodiment, the front steering assembly 103 also includes a pair of radial bearings 280 received (e.g., press-fit) into opposite sides of the central opening 278 in the hub 276 of the front wheel 108.

In the embodiment illustrated in FIGS. 8A-8D, the steering knuckle 270 includes a pair of vertical brackets or arms 281, 282 disposed on opposite sides of the front wheel 108 and a horizontal bracket 283 interconnecting upper ends of the vertical arms 281, 282. The vertical arms 281, 282 and the horizontal bracket 283 may be either integrally formed or separately formed and coupled together by any suitable process, such as, for instance, welding or mechanical fastening. Each of the vertical arms 281, 282 includes an opening 284 aligned with the central opening 278 in the hub 276 of the front wheel 108. The front axle 279 extends through the openings 284 in the vertical arms 281, 282 of the steering knuckle 270, through the pair of radial bearings 280, and through the central opening 278 in the hub 276 of the front wheel 108. Additionally, opposite ends of the front axle 279 may be coupled to the vertical arms 281, 282 of the steering knuckle 270 by any suitable mechanism, such as, for instance, with fasteners (e.g., rivets, screws, or bolts).

As illustrated in FIG. 8A, the steering knuckle 270 also includes a steering shaft 285 extending upward from the horizontal bracket 283. The steering shaft 285 extends up through an opening 286 in the support bracket 271. Additionally, in the illustrated embodiment, the steering shaft 285 is rotatably supported by a radial bearing 287 received in the opening 286 of the support bracket 271. The engagement between the steering shaft 285 and the radial bearing 287 in the support bracket 271 is configured to enable the steering motor 273 to steer the front wheel 108 into different steering angles.

Still referring to the embodiment illustrated in FIGS. 8A-8D, the front steering assembly 103 also includes a plurality of standoffs 288 coupled to an upper surface of the support bracket 271. In the illustrated embodiment, each of the standoffs 288 defines an opening 289 (e.g., an internally threaded bore) configured to receive a fastener (e.g., a countersunk screw) coupling the standoffs 288 to the deck 101. The standoffs 288 are configured to sufficiently space the support bracket 271 below the deck 101 of the motorized vehicle 100 to accommodate the series of linkages, described below.

Still referring to the embodiment illustrated in FIGS. 8A-8D, the support plate 272 is a flat plate having a circular portion 290 and a pair of front and rear rectangular portions 291, 292 projecting outward from opposite sides of the circular portion 290. In one or more alternate embodiments, the support plate 272 may have any other suitable shape. In the illustrate embodiment, the rear rectangular portion 292 of the support plate 272 supports the angular position sensor 274 and the circular portion 290 of the support plate 272 supports the steering motor 273. In the illustrated embodiment, the angular position sensor 274 and the steering motor 273 are coupled to a lower surface of the support plate 272. Additionally, in the illustrated embodiment, the front rectangular portion 291 of the support plate 272 is coupled to the support bracket 271 by any suitable mechanism, such as, for instance, fastening, bonding, welding, or combinations thereof. Although in the illustrated embodiment the support plate 272 and the support bracket 271 are separate components coupled together, in one or more alternate embodiments, the support plate 272 and the support bracket 271 may be a single integral component formed by any suitable process, such as, for instance, molding, machining, or additive manufacturing.

In the embodiment illustrated in FIGS. 8A-8D, the front steering assembly 103 also includes a rear linkage 293, a front linkage 294, and an intermediate linkage 295 disposed between the rear and front linkages 293, 294. The front steering assembly 103 also includes a series of tie brackets 296 rotatably coupling outer ends of the three linkages 293, 294, 295 together. In the illustrated embodiment, the tie brackets 296 are rotatably coupled to the outer ends of each of the linkages 293, 294, 295 by a pin 297. Upper and lower clamps 298 are coupled to each of the pins 297 to prevent the pins 297 from inadvertently disengaging the linkages 293, 294, 295 and the tie brackets 296. An inner end of the front linkage 294 is coupled to the steering shaft 285. An inner end of the rear linkage 293 is coupled to the angular position sensor 274. An inner end of the intermediate linkage 295 is coupled to an output shaft 299 of the steering motor 273. The steering motor 273 also includes an electrical connector 300 configured to electrically couple the steering motor 273 to the battery 105 (see FIG. 1A).

Figure 9:
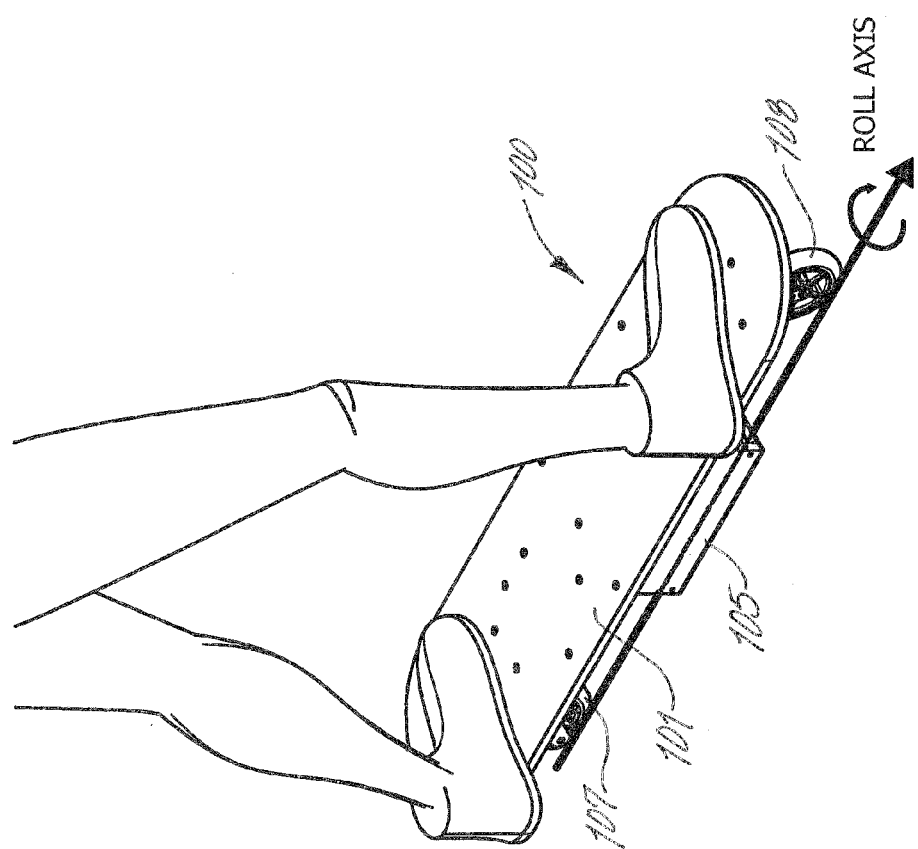
FIG. 9 illustrates a user rolling the motorized vehicle to change a direction of the motorized vehicle.

In operation, the steering motor 273 is configured to rotate the output shaft 299 and the rotation of the output shaft 299 is configured to rotate the intermediate linkage 295. Because the intermediate linkage 295 is coupled to the front linkage 294 by the tie brackets 296, the rotation of the intermediate linkage 295 is configured to rotate the front linkage 294. The rotation of the front linkage 294 is configured to rotate the steering shaft 285, the steering knuckle 270, and the front wheel 108 and thereby steer the front wheel 108 with the desired steering angular acceleration. As described in more detail below, the steering angle acceleration of the front wheel 108 is configured to be dynamically adjusted to stabilize the motorized vehicle 100 in a balanced state. For instance, as illustrated in FIG. 9, a user standing on the deck 101 of the motorized vehicle 100 may shift his center of gravity (e.g., by supinating or pronating his feet) to impart a roll to the motorized vehicle 100 and thereby steer the motorized vehicle 100 in the desired direction. In response to the roll of the motorized vehicle 100, which would otherwise tend to destabilize the motorized vehicle 100, the steering motor 273 is configured to dynamically adjust the steering angular acceleration of the front wheel 108 to stabilize the motorized vehicle 100.

Additionally, because the inner end of the rear linkage 293 is coupled to the angular position sensor 274, when the steering motor 273 is actuated to steer the front wheel 108 with the desired steering angular acceleration, the angular position sensor 274 is configured to detect the steering angle of the front wheel 108 (e.g., because the three linkages 293, 294, 295 are configured to rotate synchronously, the angular position sensor 274 coupled to the rear linkage 293 is configured to detect the steering angle of the front wheel 108). The angular position sensor 274 may be any suitable type of sensor, such as, for instance, a potentiometer or a non-contact Hall effect sensor. The angular position sensor 274 also includes an electrical connector 301 configured to electrically couple the rotational position sensor 274 to the microprocessor in the electronics housing 106 (see FIG. 1A) such that the steering angle of the front wheel 108 is transmitted to the microprocessor.

In one or more alternate embodiments, the rotational position sensor 274 may be positioned in any other suitable location for detecting the steering angle of the front wheel 108, such as, for instance, coupled to the steering shaft 285 or coupled to the output shaft 299 of the steering motor 273.

Figure 10B:
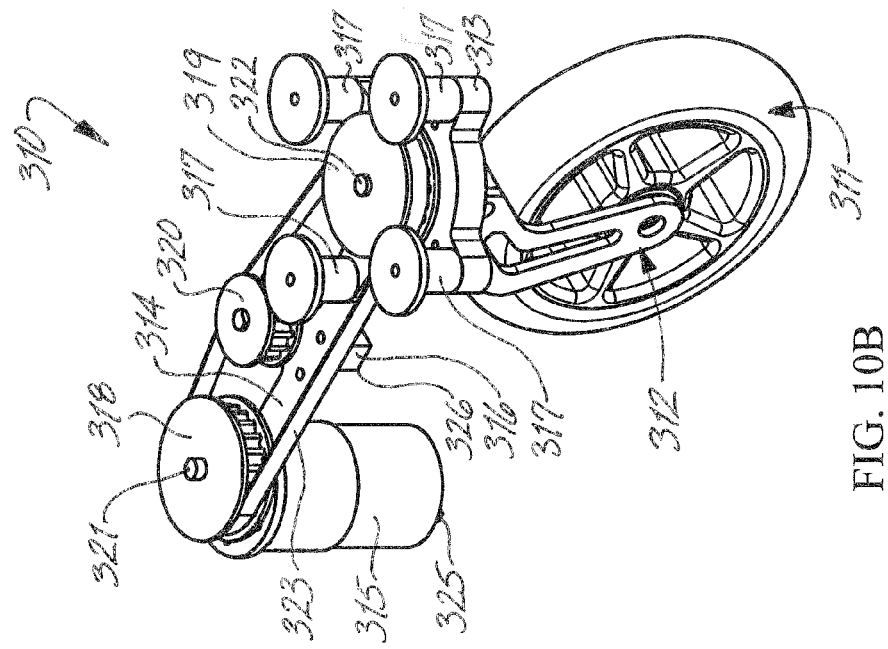
FIGS. 10A and 10B are a side view and a perspective view, respectively, of a front steering assembly according to another embodiment of the present disclosure.
Figure 10A:
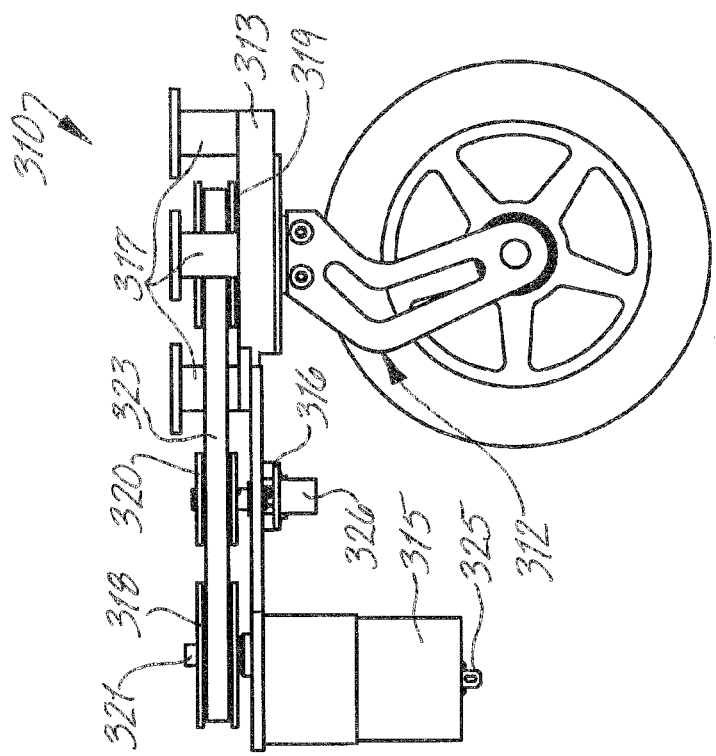

With reference now to FIGS. 10A and 10B, a front steering assembly 310 according to another embodiment of the present disclosure includes a front wheel 311, a steering knuckle 312 coupled to the front wheel 311, a support bracket 313, a support plate 314, a steering motor 315, an angular position sensor 316 configured to measure the steering angle of the front wheel 311, and a series of pulleys coupling the steering motor 315 to the front wheel 311 and coupling the angular position sensor 316 to the front wheel 311. The front wheel 311, the steering knuckle 312, and the support bracket 313 may be the same or similar to the front wheel 108, the steering knuckle 270, and the support bracket 271 described above with reference to the embodiment of the front steering assembly 103 illustrated in FIGS. 9A-9C. The front steering assembly 310 also includes a series of standoffs 317 coupled to an upper surface of the support bracket 313 and configured to receive fasteners (e.g., countersunk screws) coupling the standoffs 317 to the deck 101. The standoffs 317 are configured to sufficiently space the support bracket 313 below the deck 101 of the motorized vehicle 100 to accommodate the series of pulleys, described below.

With continued reference to the embodiment illustrated in FIGS. 10A and 10B, the front steering assembly 310 also includes a rear pulley 318, a front pulley 319, and an intermediate pulley 320 disposed between the rear and front pulleys 318, 319. The rear pulley 318 is coupled to an output shaft 321 of the steering motor 315 and the front pulley 319 is coupled to a steering shaft 322 of the steering knuckle 312. The steering motor 315 also includes an electrical connector 325 configured to electrically couple the steering motor 316 to the battery 105. Additionally, the rear pulley 318 is coupled to the front pulley 319 by any suitable mechanism, such as, for instance, a belt (e.g., a smooth or toothed belt) or a chain 323. In operation, the output shaft 321 of the steering motor 315 rotates the rear pulley 318 and the belt or chain 323 rotates the front pulley 319. The rotation of the front pulley 319 is configured to rotate the steering shaft 322, the steering knuckle 312, and the front wheel 311 and thereby steer the front wheel 312 with the steering angular acceleration necessary to stabilize the motorized vehicle 100.

Still referring to the embodiment illustrated in FIGS. 10A and 10B, the intermediate pulley 320 of the front steering assembly 310 is coupled to the angular position sensor 316. The intermediate pulley 320 is also engaged by the belt or chain 323. Accordingly, when the steering motor 315 drives the belt or chain 323 to change the steering angular acceleration of the front wheel 311, the angular position sensor 316 detects the steering angle of the front wheel 311 (e.g., because the belt or chain 323 is configured to rotate the three pulleys 318, 319, 320 synchronously, the angular position sensor 316 coupled to the intermediate pulley 320 is configured to detect the steering angle of the front wheel 311). The angular position sensor 316 may be any suitable type of sensor, such as, for instance, a potentiometer or a non-contact Hall effect sensor. The angular position sensor 316 also includes an electrical connector 326 configured to electrically couple the angular position sensor 316 to the microprocessor in the electronics housing 106 (see FIG. 1A) such that the steering angle of the front wheel 311 is transmitted to the microprocessor. In one or more alternate embodiments, the rotational position sensor 316 may be positioned in any other suitable location for detecting the steering angle of the front wheel 311, such as, for instance, coupled to the steering shaft 322 or coupled to the output shaft 321 of the steering motor 315.

Figure 11:
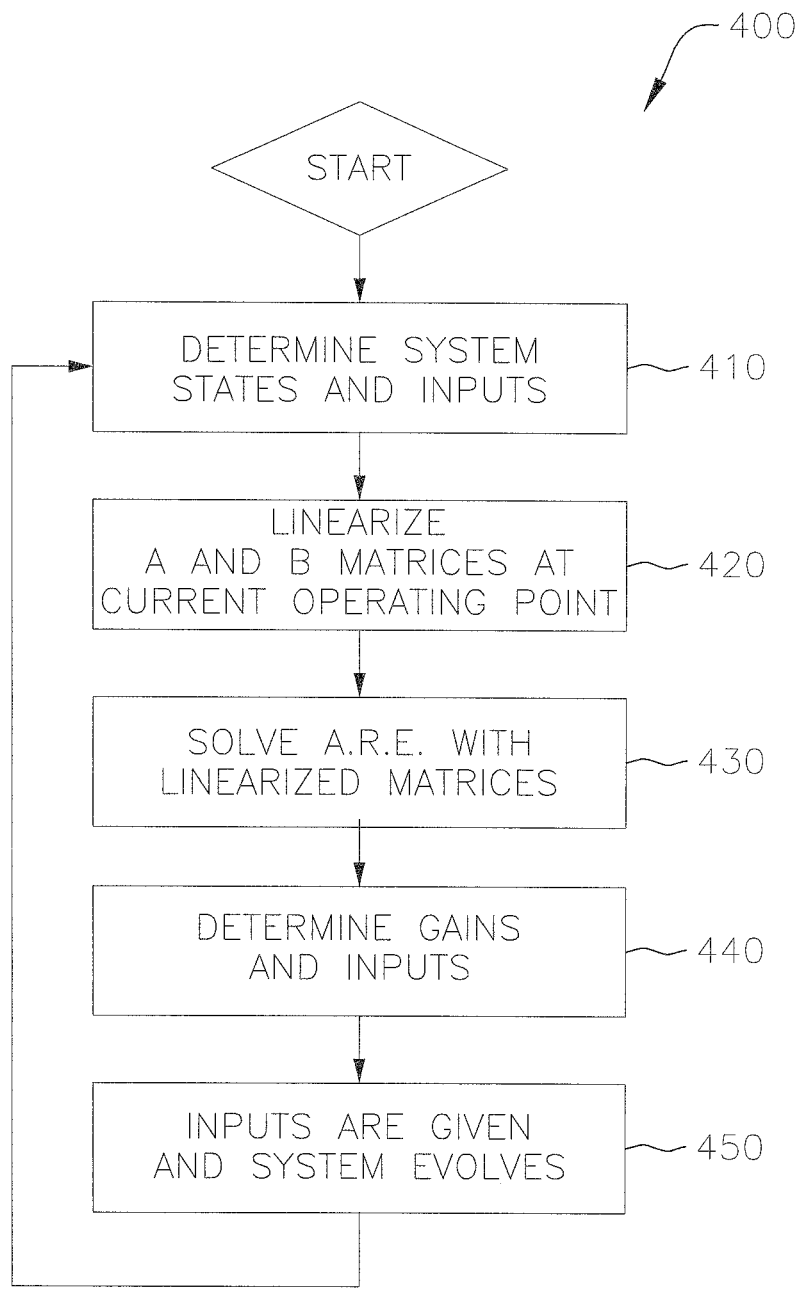
FIG. 11 is a flowchart illustrating the tasks of calculating a steering angular acceleration of the front wheel necessary to balance the motorized vehicle according to one embodiment of the present disclosure.

FIG. 11 is a flowchart illustrating a method 400 according to one embodiment of the present disclosure for determining the steering angular acceleration of the front wheel 108, 311 necessary to dynamically stabilize the motorized vehicle 100. In the illustrated embodiment, the method 400 includes a task 410 of determining the state of the motorized vehicle 100 and the outputs from various sensors. The electronics housing 106 (see FIG. 1A) contains sensors configured to detect a variety of dynamic conditions of the motorized vehicle 100 that enable the dynamic stabilization of the motorized vehicle 100 by controlling the steering angle acceleration of the front wheel 108, 311. In one embodiment, the electronics housing 106 includes a 3-axis gyroscope and a 3-axis accelerometer. Together, the 3-axis gyroscope and the 3-axis accelerometer are configured to measure the roll angle of the deck 101, the roll angular velocity of the deck 101 (i.e., the time derivative of the roll angle of the deck 101), the pitch of the deck 101, and the roll of the ground. The data measured from the 3-axis gyroscope and the 3-axis accelerometer may be combined with sensor fusion techniques (e.g., the Kalman filter or the complementary filter) to obtain a more accurate representation of the system and to reduce noise. In one embodiment, the electronics housing 106 may optionally also include a global positioning system (GPS) sensor and/or a 3-axis magnetometer to improve the accuracy of the control system.

The electronics housing 106 also houses a microprocessor programmed with a control algorithm. The microprocessor is configured to receive output signals from the 3-axis accelerometer, the 3-axis gyroscope, the angular speed sensor 130 in the rear drive assembly 102, and the steering angle sensor 204, 274 in the front steering assembly 103, 310 (e.g., the microprocessor is configured to receive the roll angle of the deck 101, the roll angular velocity of the deck 101, the pitch of the deck 101, the roll angle of the ground, the angular velocity of the rear wheel 107, and the steering angle of the front wheel 108, 311). The microprocessor is also configured to determine the steering angular velocity of the front wheel 108, 311 by calculating the time derivative of the steering angle of the front wheel 108, 311. Based on these inputs, the control algorithm programmed on the microprocessor is configured to calculate the steering angular acceleration of the front wheel 108, 311 necessary to stabilize the motorized vehicle 100. The electronics housing 106 also contains a microcontroller configured to send a pulse-width modulated (PWM) signal to the steering motor 273, 315 to steer the front wheel 108, 311 at the angular acceleration necessary to maintain the stability of the motorized vehicle 100.

The linear quadratic regulator (L.Q.R.) is a method for controlling a linear time-invariant system in state space form. The L.Q.R. method involves solving the Algebraic Riccati Equation (A.R.E.), given as follows: $A^TP+PA-PBR^{-1}B^TP+Q=0$, where A is the system state matrix, B is the input matrix, Q is the matrix to tune state dependent gains, R is the matrix to tune input dependent gains, and P is the solution to the A.R.E. In one embodiment, the tuning matrices Q and R may be held constant throughout time, although in one or more alternate embodiments, the control method may include using time-variant tuning matrices Q and R to achieve greater control of the system. In one embodiment, the tuning matrices Q and R may be as follows:

$$Q = \begin{bmatrix} 1.5 & 0 & 0 & 0 \\ 0 & 10 & 0 & 0 \\ 0 & 0 & 3 & 0 \\ 0 & 0 & 0 & 8 \end{bmatrix} R = [0.125].$$

The L.Q.R. method is only applicable to systems that are linear time-invariant. Because the motorized vehicle 100 of the present disclosure is a non-linear system, a method of non-linear control must be applied to the system. The State Dependent Riccati Equation (SDRE) method is a method of non-linear control based on the L.Q.R. method described above. The SDRE method involves linearizing the system matrix A and the input matrix B at each instant in time. Linearizing the system matrix A and the input matrix B approximates a non-linear time-invariant system as a linear time-variant system. The matrix form of the linearized state equations is given as follows:

$$\begin{bmatrix} \delta \dot{x}_0 \\ \delta \dot{x}_1 \\ \delta \dot{x}_3 \\ \delta \dot{x}_4 \end{bmatrix} = \begin{bmatrix} 0 & 1 & 0 & 0 \\ \frac{\partial x_0}{\partial \dot{x}_1} & 0 & \frac{\partial x_3}{\partial \dot{x}_1} & 0 \\ 0 & 0 & 0 & 1 \\ 0 & 0 & 0 & 0 \end{bmatrix} \begin{bmatrix} \delta x_0 \\ \delta x_1 \\ \delta x_3 \\ \delta x_4 \end{bmatrix} + \begin{bmatrix} 0 \\ 0 \\ 0 \\ 1 \end{bmatrix} [\delta u_0]$$

where $x_0$ is the roll angle of the deck 101, $x_1$ is the roll angular velocity of the deck 101, $x_3$ is the steering angle of the front wheel 108, 311, $x_4$ is the steering angular velocity of the front wheel 108, 311, and $u_0$ is the steering angular acceleration of the front wheel 108, 311. The instantaneous linearized system matrix A is referred to as $A(\tau)$ and the instantaneous linearized input matrix B is referred to as $B(\tau)$. Accordingly, as illustrated in FIG. 11, the method 400 includes a task 420 of linearizing the system matrix A and the input matrix B at each instant in time. The control method 400 then includes a task 430 of solving the A.R.E., described above, at each instant in time using the instantaneous linearized system matrix A(τ) and the instantaneous linearized input matrix B(τ) determined by the SDRE method.

The method 400 also includes a task 440 of determining the gains K and inputs u to the system. The gains K are determined as follows: $K=R^{-1} B^T P$. The gain matrix K is configured to ensure that the system with feedback has negative eigenvalues, and therefore ensures a stable system. The inputs u given to the system are determined as follows: $u=-Kx$. The method 400 also includes a task 450 of sending an output signal from the microcontroller in the electronics housing 106 to the steering motor to control the front wheel 108, 311 with the angular steering acceleration necessary to stabilize the motorized vehicle 100. The above-described tasks 410-450 may then be repeatedly performed to maintain the stability of the motorized vehicle 100.

As described above, the steering angular acceleration of the front wheel 108, 311 required to stabilize the motorized vehicle 100 is determined by solving the A.R.E. at each instant in time by linearizing the system matrix A and the input matrix B at each instant in time with the SDRE method. To physically cause the front wheel 108, 311 to turn with the required angular acceleration to stabilize the motorized vehicle 100, the steering torque $T_s$ applied by the steering motor 273, 315 to the front wheel 108, 311 may be calculated as follows: $T_s = I_s \ddot{\psi}_s - T_f$, where $I_s$ is the rotational moment of inertia of the components of the front steering assembly 103, 310 that are configured to rotate (e.g., the front wheel 108, 311 and the steering knuckle 270, 312), $\ddot{\psi}_s$ is the steering angle acceleration of the front wheel 108, 311 required to stabilize the motorized vehicle 100, and $T_f$ is the frictional torque losses in the front steering assembly 103, 310. The steering assembly rotational moment of inertia $I_s$ is a function, in part, of the mass, size, and configuration of the front wheel 108, 311. The frictional torque losses $T_f$ are primarily due to the contact between the front wheel 108, 311 and the ground or other surface on which the motorized vehicle 100 is being operated. As described in more detail below, the frictional losses $T_f$ in the front steering assembly 103, 310 may be accounted for by using a control loop feedback mechanism.

The torque $T_m$ of the steering motor 273, 315 required to steer the front wheel 108, 311 with the steering angle acceleration required to stabilize the motorized vehicle 100 may be calculated as follows:

$$\frac{\ddot{\psi}_s}{T_m} = \frac{1}{n\left(\frac{I_s}{n^2} + I_m\right)},$$

where n is the gear ratio of the steering motor 273, 315 and $I_m$ is the rotational moment of inertia of the steering motor 273, 315. In an embodiment in which the steering motor 273, 315 is a DC motor, the motor voltage $V_m$ required to turn the front wheel 108, 311 with the steering angular acceleration required to stabilize the motorized vehicle 100 may be calculated as follows:

$$\frac{T_m}{V_m} = \frac{K_t}{R_m},$$

where $R_m$ is the winding resistance of the steering motor 273, 315 and $K_t$ is the torque constant of the steering motor 273, 315. The ratio of the motor voltage $V_m$ of the steering motor 273, 315 to the angular acceleration of the front wheel 108, 311 required to stabilize the motorized vehicle 100 can be expressed as follows:

$$\frac{V_m}{\ddot{\psi}_s} = \frac{R_m n \left(\frac{I_s}{n^2} + I_m\right)}{K_t}.$$

The winding resistance $R_m$ of the steering motor 273, 315, the torque constant $K_t$ of the steering motor 273, 315, the gear ratio n of the steering motor 273, 315, the rotational moment of inertia $I_m$ of the steering motor 273, 315, and rotational moment of inertia $I_s$ of the front steering assembly 103, 310 are all constant. Together, these constants $R_m$, $K_t$, $I_m$, and $I_s$ can be expressed as $K_w$. Thus, the voltage $V_m$ of the steering motor 273, 315 necessary to drive the front wheel 108, 311 with the angular acceleration required to stabilize the motorized vehicle 100 can be expressed as follows: $V_m = \ddot{\psi}_s K_w$. Accordingly, the voltage $V_m$ of the steering motor 273, 315 required to steer the front wheel 108, 311 with the angular acceleration necessary to stabilize the motorized vehicle 100 is proportional to the required steering angular acceleration $\ddot{\psi}_s$ of the front wheel 108, 311.

The output voltage $V_m$ of the steering motor 273, 315 is determined by the voltage $V_s$ supplied to the steering motor 273, 315 and the motor back electromotive force ("back emf"), $V_{emf}$. The voltage $V_s$ supplied to the steering motor 273, 315 is controlled by the motor controller in the electronics housing 106. The back emf $V_{emf}$ develops as a function of the steering motor speed and the velocity constant $K_v$. The voltage $V_s$ required to be supplied by the motor controller to the steering motor 273, 315 to drive the front wheel 108, 311 with the steering angular acceleration required to stabilize the motorized vehicle 100 is as follows: $V_s = \ddot{\psi}_s K_w + \dot{\psi}_s K_v$.

Figure 12:
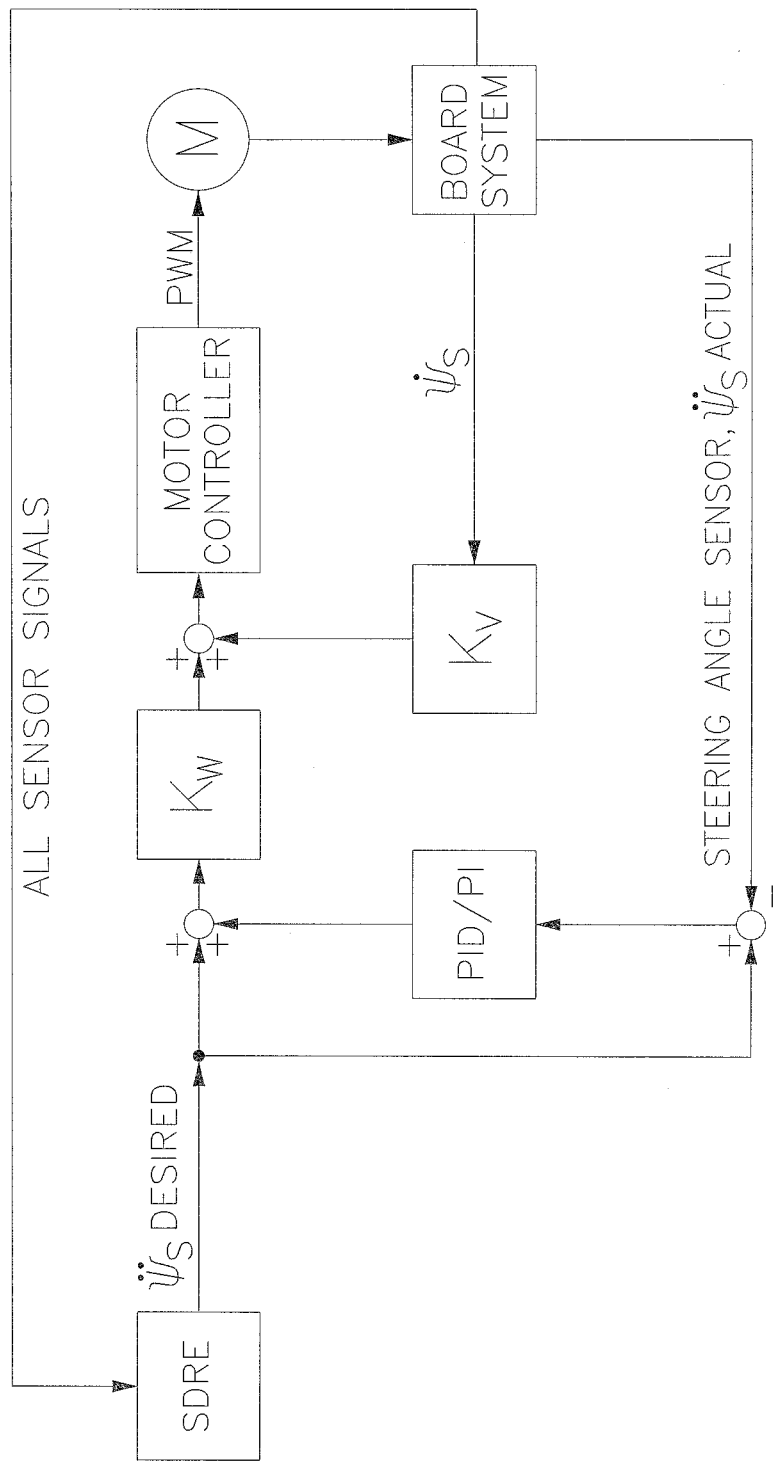
FIG. 12 is a schematic diagram of a control loop feedback mechanism for controlling the front wheel angular acceleration to stabilize the motorized vehicle according to one embodiment of the present disclosure.
Figure 13:
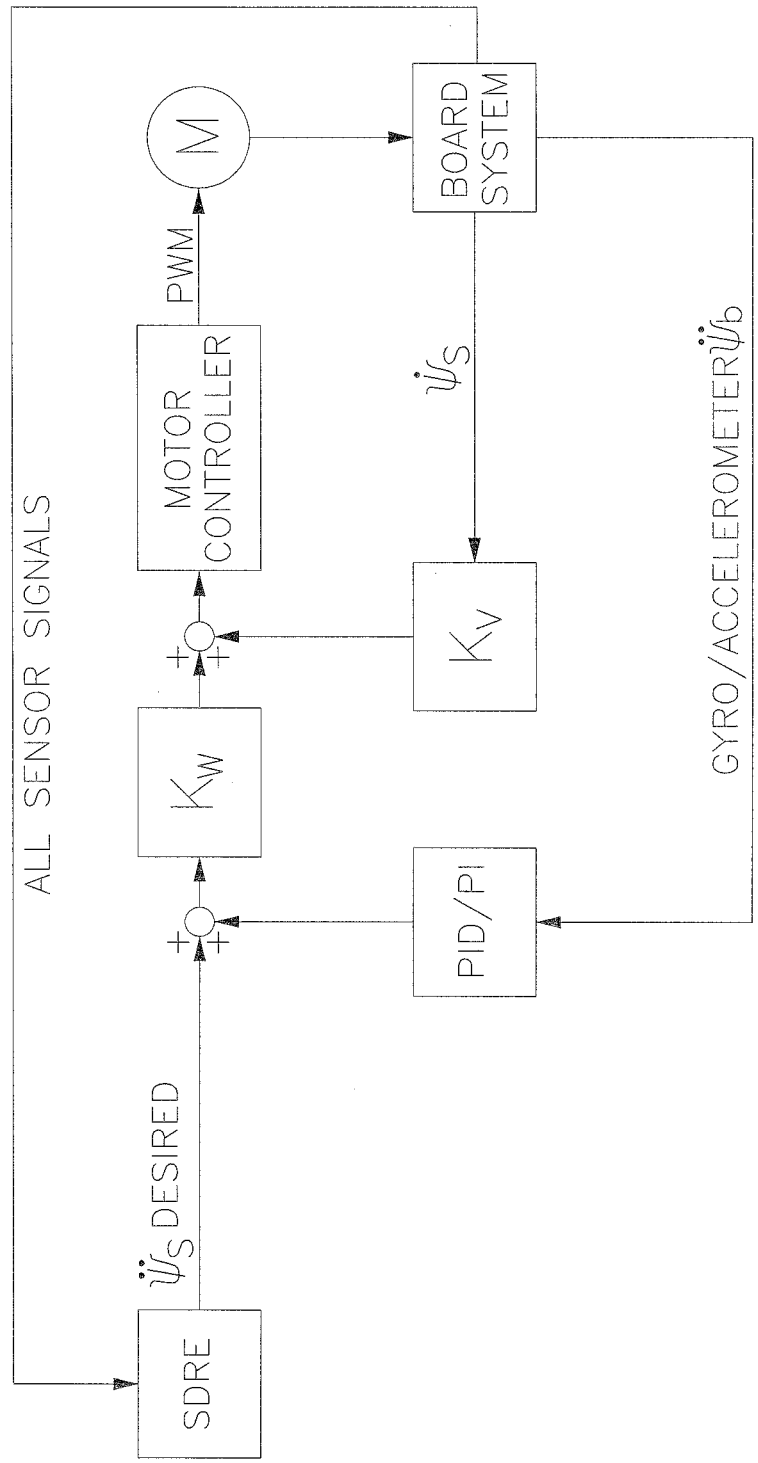
FIG. 13 is a schematic diagram of a control loop feedback mechanism for controlling the front wheel angular acceleration to stabilize the motorized vehicle according to another embodiment of the present disclosure.

To determine and account for the losses in the system (e.g., the frictional torque losses $T_f$), the motorized vehicle 100 may include a control loop feedback mechanism (e.g., a proportional-integral (PI) or a proportion-integral-derivative (PID) controller). In the embodiment illustrated in FIG. 12, the PI or PID controller may be configured to calculate the difference between the desired steering angular acceleration $\ddot{\psi}_s$ of the front wheel 108, 311 and the actual steering angular acceleration of the front wheel 108, 311. Based on the difference between the actual and desired steering angular acceleration of the front wheel 108, 311, the controller is configured to send a signal to steering motor 273, 315 to adjust the steering angular acceleration of the front wheel 108, 311 to stabilize the motorized vehicle 100. In another embodiment illustrated in FIG. 13, the PI or PID controller may be configured to compensate for the losses in the system by receiving feedback from the roll angular acceleration of the deck 101.

Although in the illustrated embodiment the motorized vehicle 100 includes a pair of inline wheels 107, 108 (i.e., the front wheel 108 in-line with the rear wheel 107), in one or more alternate embodiments, the motorized vehicle 100 may have any other suitable number of wheels and the wheels may be arranged in any suitable configuration, such as, for instance, three wheels arranged in a triangular configuration or four wheels arranged in a rectangular configuration. As described above, in an embodiment in which the motorized vehicle 100 is inherently unstable (e.g., the motorized vehicle includes a pair of in-line wheels 107, 108), the front steering assembly 103 is configured to actively control the steering angle acceleration of the front wheel 108 to stabilize the motorized vehicle 100. In an embodiment in which the motorized vehicle 100 is inherently stable (e.g., the motorized vehicle 100 includes three arranged in a triangular configuration or four wheels arranged in a rectangular configuration), the motorized vehicle 100 may be provided without the control mechanism for steering the front wheel 108, 311 of the front steering assembly 103, 310. The rear drive assembly 102 and the footpad assembly 104 may be incorporated into a motorized vehicle having either an inherently unstable arrangement of wheels (e.g., a pair of in-line wheels) or an inherently stable arrangement of wheels (e.g., three wheels arranged in a triangular configuration or four wheels arranged in a rectangular configuration).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A motorized vehicle, comprising:
a deck configured to support a rider;
a plurality of wheels coupled to the deck;
a footpad rotatably coupled to the deck, the footpad configured to rotate about an axis perpendicular to the deck between a neutral position and an engaged position; and
a drive motor operatively coupled to at least one of the plurality of wheels and electrically coupled to the footpad, wherein the drive motor is configured to rotate the at least one of the plurality of wheels when the footpad is in the engaged position.

2. The motorized vehicle of claim 1, further comprising:
an angular position sensor configured to detect the angular position of the footpad;
a microprocessor electrically coupled to the angular position sensor, wherein the microprocessor is configured to process an output signal from the angular position sensor; and
a controller electrically coupled to the drive motor, wherein the controller is configured to send a signal to the drive motor to rotate the at least one of the plurality of wheels based on the angular position of the footpad, and wherein the drive motor is configured to rotate the at least one of the plurality of wheels at a first speed when the footpad is in a first angular position and the drive motor is configured to rotate the at least one of the plurality of wheels at a second speed greater than the first speed when the footpad is in a second angular position greater than the first angular position.

3. The motorized vehicle of claim 2, wherein the drive motor is further configured to decelerate the at least one of the plurality of wheels when the footpad is in a third angular position.

4. The motorized vehicle of claim 2, wherein the angular position sensor is selected from the group of sensors consisting of a magnetic angular position sensor, an optical angular position sensor, a rotary potentiometer, and a resistive rotary position sensor.

5. The motorized vehicle of claim 1, further comprising a resilient member coupled to the footpad to bias the footpad into the neutral position.

6. The motorized vehicle of claim 1, further comprising:
a first spring coupled to the footpad; and
a second spring coupled to the footpad, wherein
the footpad engages the first spring when the footpad rotates in a first direction to bias the footpad into the neutral position, and
the footpad engages the second spring when the footpad rotates in a second direction opposite the first direction to bias the footpad into the neutral position.

7. The motorized vehicle of claim 1, wherein the plurality of wheels comprises a first wheel and a second wheel in-line with the first wheel.

8. The motorized vehicle of claim 1, wherein the plurality of wheels comprises four wheels arranged in a rectangular configuration.

9. The motorized vehicle of claim 2, further comprising a switch coupled to the angular position sensor, wherein:
when the switch is in a first position the drive motor is configured to rotate the at least one of the plurality of wheels when the footpad rotates in a first direction, and
when the switch is in a second position the drive motor is configured to rotate the at least one of the plurality of wheels when the footpad rotates in a second direction opposite the first direction.

10. The motorized vehicle of claim 1, wherein the drive motor is configured not to rotate the at least one of the plurality of wheels when the angular position of the footpad is within an angular deadzone about the neutral position.

11. The motorized vehicle of claim 1, further comprising an opening defined in the deck, wherein an upper surface of the footpad is exposed through the opening in the deck.

12. The motorized vehicle of claim 1, further comprising a battery electrically coupled to the drive motor.

13. An actively stabilized motorized vehicle, comprising:
a deck configured to support a rider;
a first wheel coupled to the deck;
a second wheel steerably coupled to the deck and in-line with the first wheel;
a steering motor operatively coupled to the second wheel, the steering motor configured to adjust a steering angle of the second wheel between a first steering angle and a second steering angle;
a plurality of sensors configured to measure a plurality of dynamic conditions of the motorized vehicle;
a microprocessor programmed with an algorithm configured to calculate a stabilizing steering angle acceleration of the second wheel based on the plurality of dynamic conditions of the motorized vehicle necessary to stabilize the motorized vehicle; and a controller configured to send a signal to the steering motor to steer the second wheel with the stabilizing steering angle acceleration to stabilize the motorized vehicle.

14. The actively stabilized motorized vehicle of claim 13, wherein the plurality of sensors comprises a 3-axis gyroscope, a 3-axis accelerometer, and a steering angle sensor.

15. The actively stabilized motorized vehicle of claim 14, wherein the plurality of sensors further comprises a wheel speed sensor or wherein the microprocessor is configured to measure commutation of a drive motor coupled to the first wheel.

16. The actively stabilized motorized vehicle of claim 13, wherein the algorithm is a state dependent Riccati equation.

17. The actively stabilized motorized vehicle of claim 13, wherein the plurality of dynamic conditions measured by the plurality of sensors is selected from the group consisting of a roll angle of the deck, an angular velocity of the deck, a linear velocity of the deck, a linear acceleration of the deck, the steering angle of the second wheel, a steering angle velocity of the second wheel, a pitch angle of the ground, and a roll angle of the ground.

18. The actively stabilized motorized vehicle of claim 13, further comprising:

a footpad rotatably coupled to the deck, the footpad configured to rotate between a neutral position and an engaged position; and a drive motor operatively coupled to at least one of the first wheel and the second wheel and electrically coupled to the footpad, wherein the drive motor is configured to rotate the at least one of the first wheel and the second wheel based on an angular position of the footpad.

19. The actively stabilized motorized vehicle of claim 13, further comprising a control loop feedback mechanism configured to account for losses in controlling the second wheel with the stabilizing steering angular acceleration.

20. The actively stabilized motorized vehicle of claim 19, wherein the control loop feedback mechanism is configured to determine an error between the stabilizing steering angular acceleration of the second wheel and an actual steering angular acceleration of the second wheel.

21. The actively stabilized motorized vehicle of claim 19, wherein the control loop feedback mechanism is configured to measure a roll angular acceleration of the deck.

* * * * *